US010433690B2

(12) United States Patent
Nieschwitz et al.

(10) Patent No.: US 10,433,690 B2
(45) Date of Patent: Oct. 8, 2019

(54) CENTRAL VACUUM SYSTEM AND INLET VALVES THEREFOR

(71) Applicant: H-P Products, Inc., Louisville, OH (US)

(72) Inventors: Darrell V. Nieschwitz, Louisville, OH (US); Greg A. Calderone, Canton, OH (US); Shawn C. Metz, Louisville, OH (US)

(73) Assignee: H-P Products, Inc., Louisville, OH (US)

( * ) Notice: Subject to any disclaimer, the term of this patent is extended or adjusted under 35 U.S.C. 154(b) by 64 days.

(21) Appl. No.: 15/675,228

(22) Filed: Aug. 11, 2017

(65) Prior Publication Data

US 2017/0332858 A1 Nov. 23, 2017

Related U.S. Application Data

(63) Continuation-in-part of application No. 14/570,159, filed on Dec. 15, 2014, now Pat. No. 9,782,047.

(60) Provisional application No. 61/923,949, filed on Jan. 6, 2014, provisional application No. 62/457,558, filed on Feb. 10, 2017.

(51) Int. Cl.
| | |
|---|---|
| *A47L 9/00* | (2006.01) |
| *A47L 5/38* | (2006.01) |
| *A47L 9/24* | (2006.01) |
| *A47L 7/00* | (2006.01) |
| *A47L 9/28* | (2006.01) |
| *A47L 9/02* | (2006.01) |
| *B60S 1/64* | (2006.01) |

(52) U.S. Cl.
CPC .............. *A47L 9/0009* (2013.01); *A47L 5/38* (2013.01); *A47L 7/0076* (2013.01); *A47L 9/02* (2013.01); *A47L 9/242* (2013.01); *A47L 9/244* (2013.01); *A47L 9/2857* (2013.01); *B60S 1/64* (2013.01)

(58) Field of Classification Search
CPC ... A47L 5/38; A47L 9/24; A47L 9/242; A47L 9/244
USPC .............. 15/301, 314, 315; 137/512.5, 560; 251/193, 356
See application file for complete search history.

(56) References Cited

U.S. PATENT DOCUMENTS

| | | | |
|---|---|---|---|
| 2,943,698 A | 7/1960 | Bishop | |
| 2,953,806 A * | 9/1960 | Walker | ...................... A47L 5/38 15/315 |

(Continued)

*Primary Examiner* — Sean K. Hunter
*Assistant Examiner* — Thomas Raymond Rodgers
(74) *Attorney, Agent, or Firm* — Sand, Sebolt & Wernow Co., LPA

(57) ABSTRACT

A central vacuum cleaning system includes an inlet valve mounted at various locations in a structure connected to the inlet end of a vacuum conduit. A section of hose is slidably mounted within the conduit and extends from the inlet valve for cleaning an adjacent area. A pair of seals within the inlet valve retains a nozzle handle mounted on the end of the hose in a stored position when the hose is in a retracted position and provides an air seal between the handle and vacuum supply conduit. A locking mechanism mounted on one embodiment of the inlet valves automatically locks the hose in a selected extended position when manually pulled from the inlet valve. A mounting bracket enables the inlet valve to be mounted at various locations in the structure and a pair of seals enables the inlet valve to be open to the ambient atmosphere.

12 Claims, 34 Drawing Sheets

(56) References Cited

U.S. PATENT DOCUMENTS

| | | | |
|---|---|---|---|
| 3,173,164 A | 3/1965 | Congdon | |
| 3,353,996 A * | 11/1967 | Hamrick | A47L 5/38 134/21 |
| 3,464,858 A * | 9/1969 | Hamrick | A47L 5/38 134/21 |
| 3,520,725 A * | 7/1970 | Hamrick | A47L 5/38 134/21 |
| 3,565,103 A * | 2/1971 | Maselek | A47L 5/38 137/360 |
| 3,593,363 A * | 7/1971 | Hamrick | A47L 5/38 15/315 |
| 3,676,986 A * | 7/1972 | Reiling | A47L 5/38 15/314 |
| 4,050,113 A * | 9/1977 | Wright | A47L 9/244 15/315 |
| 4,213,479 A * | 7/1980 | Pearson | E03F 7/10 137/205 |
| 4,336,427 A | 6/1982 | Lindsay | |
| 4,664,457 A * | 5/1987 | Suchy | H01R 24/76 439/142 |
| 4,688,596 A * | 8/1987 | Liebmann | A47L 5/38 137/360 |
| 5,784,750 A * | 7/1998 | Sankovic | F16L 37/248 15/246.2 |
| 6,459,056 B1 * | 10/2002 | Graham | A47L 5/38 15/314 |
| 7,010,829 B2 * | 3/2006 | Harman | A47L 5/38 15/314 |
| 7,624,472 B2 | 12/2009 | Ambrose | |
| 7,945,990 B2 | 5/2011 | Gabric et al. | |
| 8,001,650 B2 * | 8/2011 | Trotter | A47L 5/38 15/314 |
| 8,479,353 B2 * | 7/2013 | Drivstuen | A47L 9/242 15/301 |
| 8,590,098 B2 | 11/2013 | Smith et al. | |
| 2006/0169322 A1 * | 8/2006 | Torkelson | B65H 75/36 137/355.2 |
| 2007/0017057 A1 * | 1/2007 | Zimmerle | A47L 5/225 15/315 |
| 2014/0150889 A1 * | 6/2014 | Ragner | F16L 11/11 137/14 |
| 2014/0259509 A1 * | 9/2014 | Harman | A47L 5/38 15/315 |

\* cited by examiner

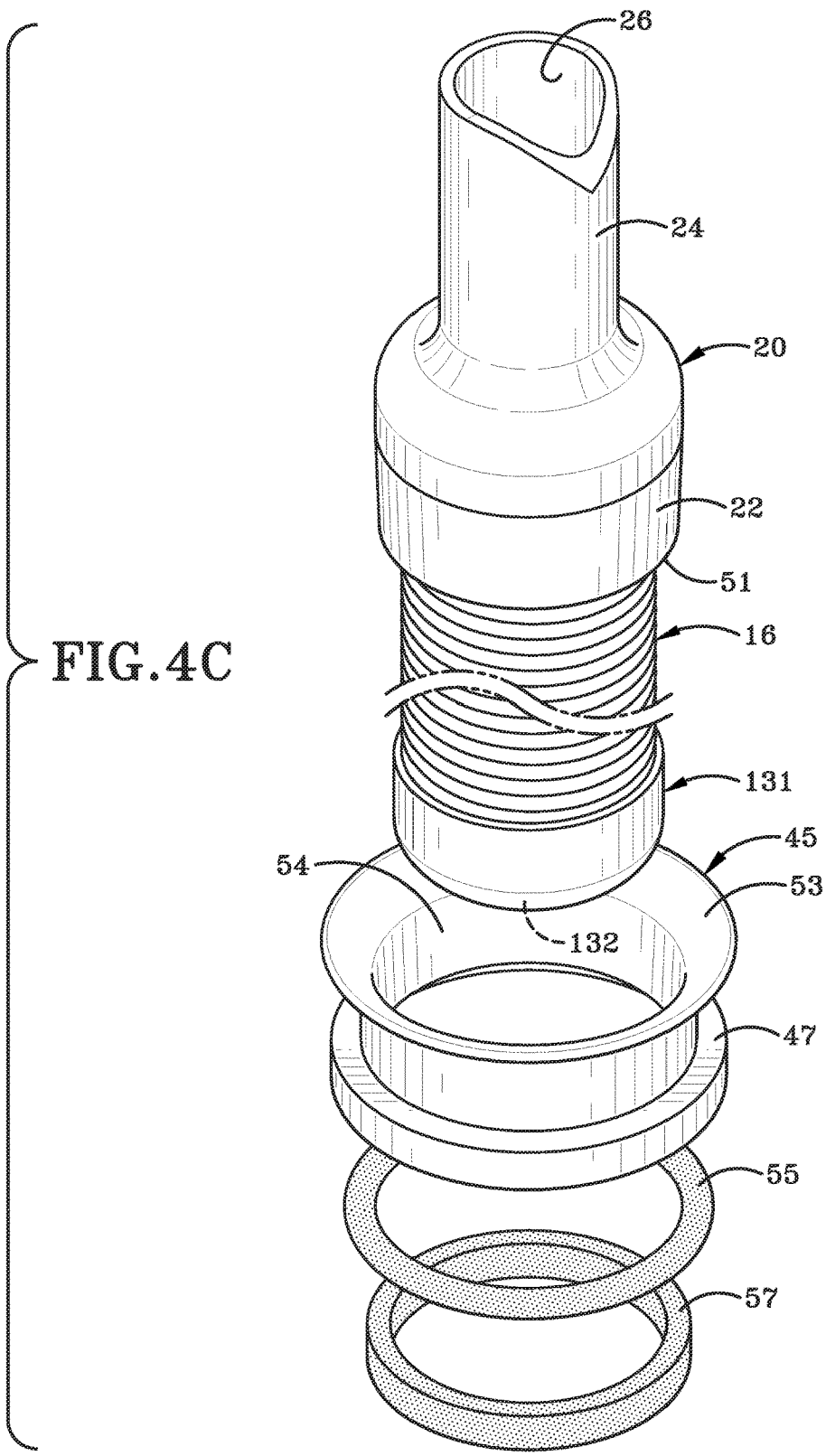

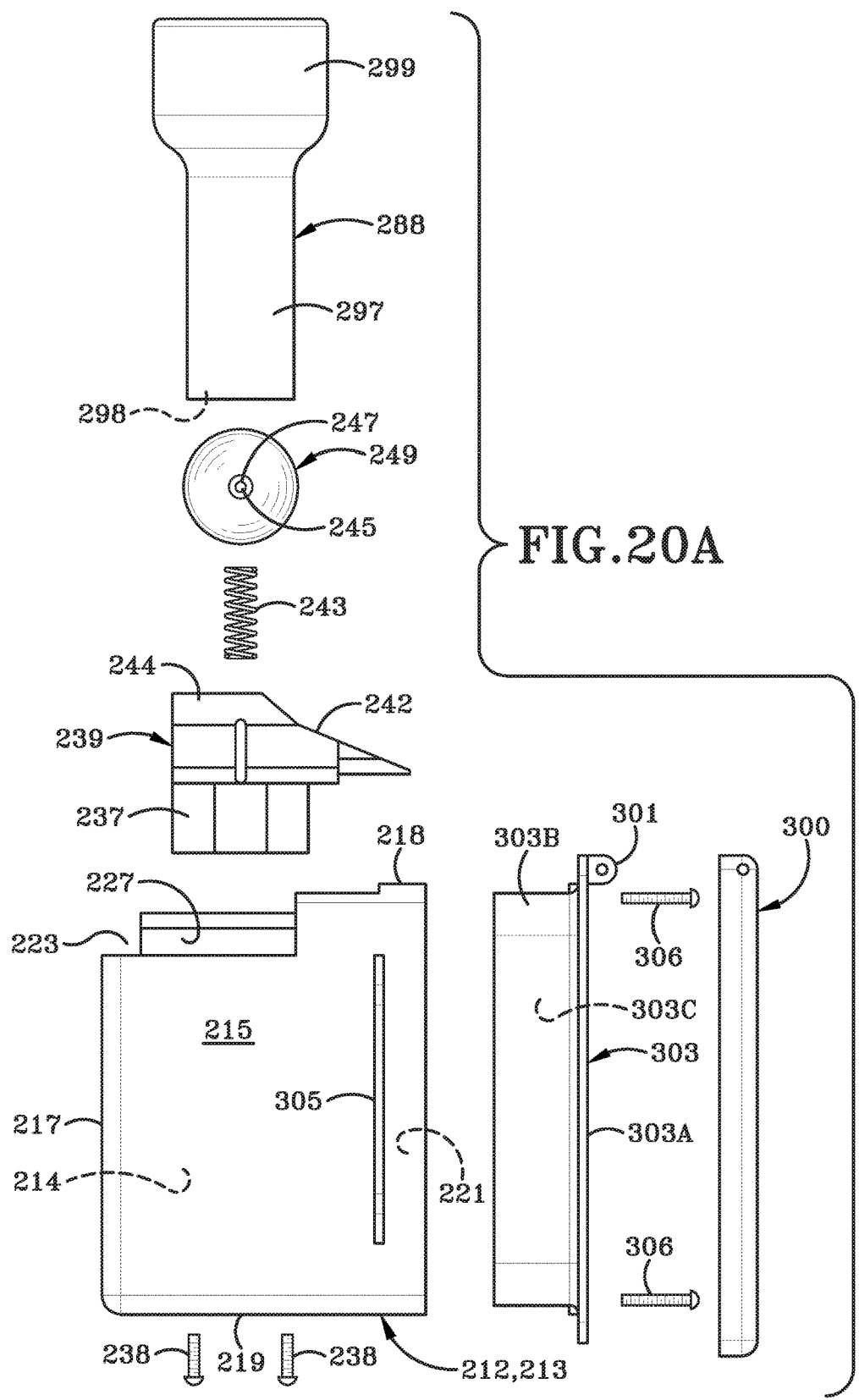

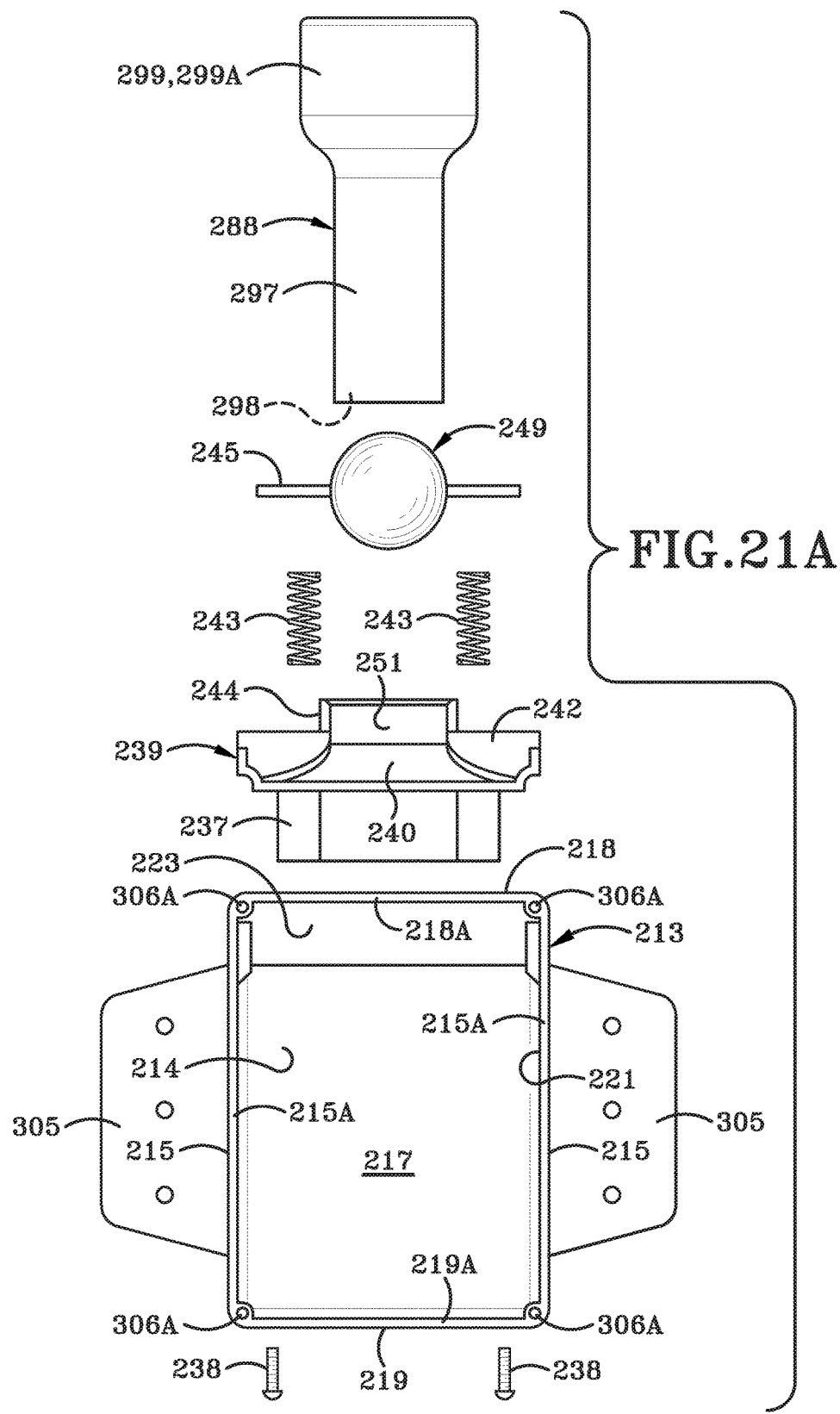

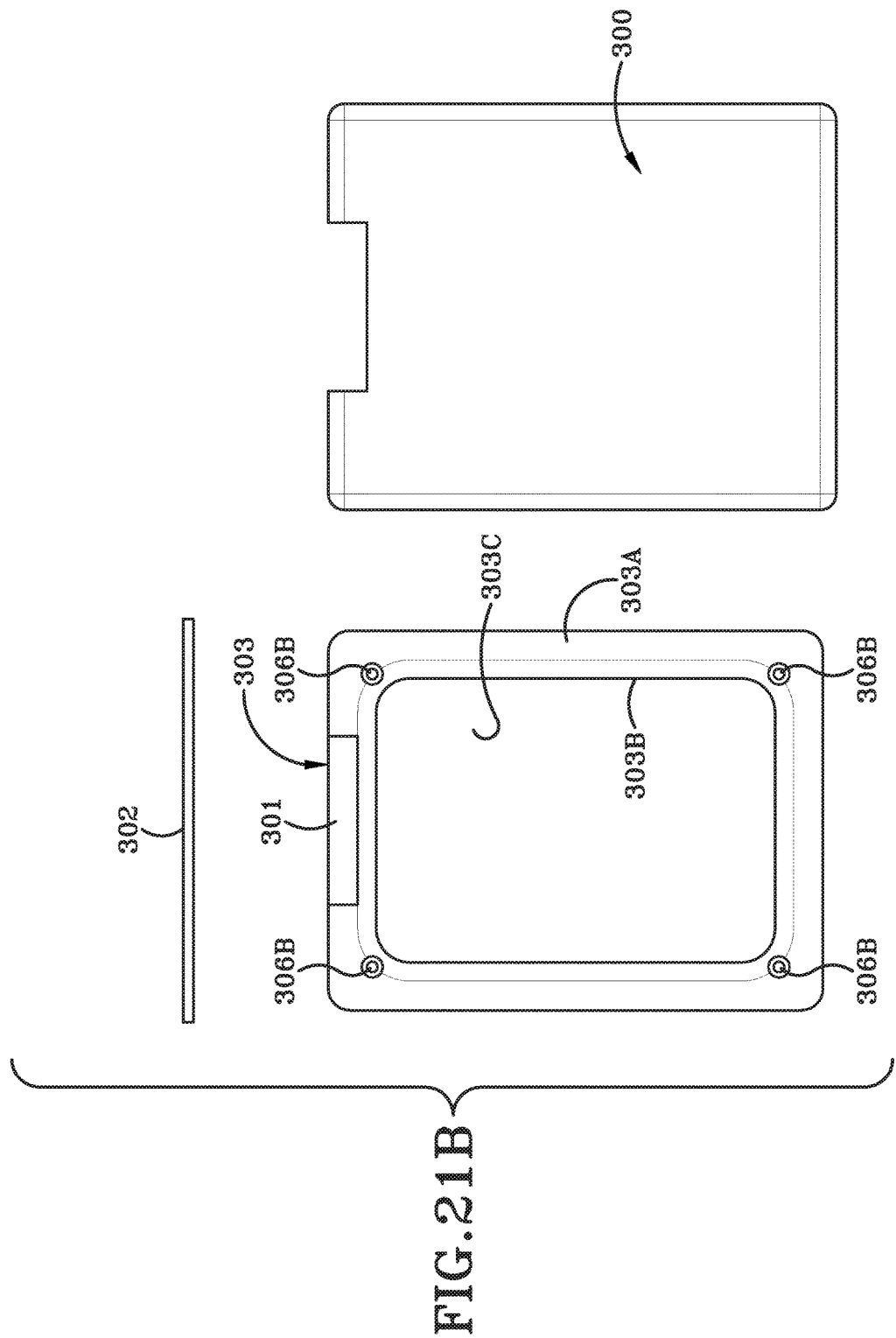

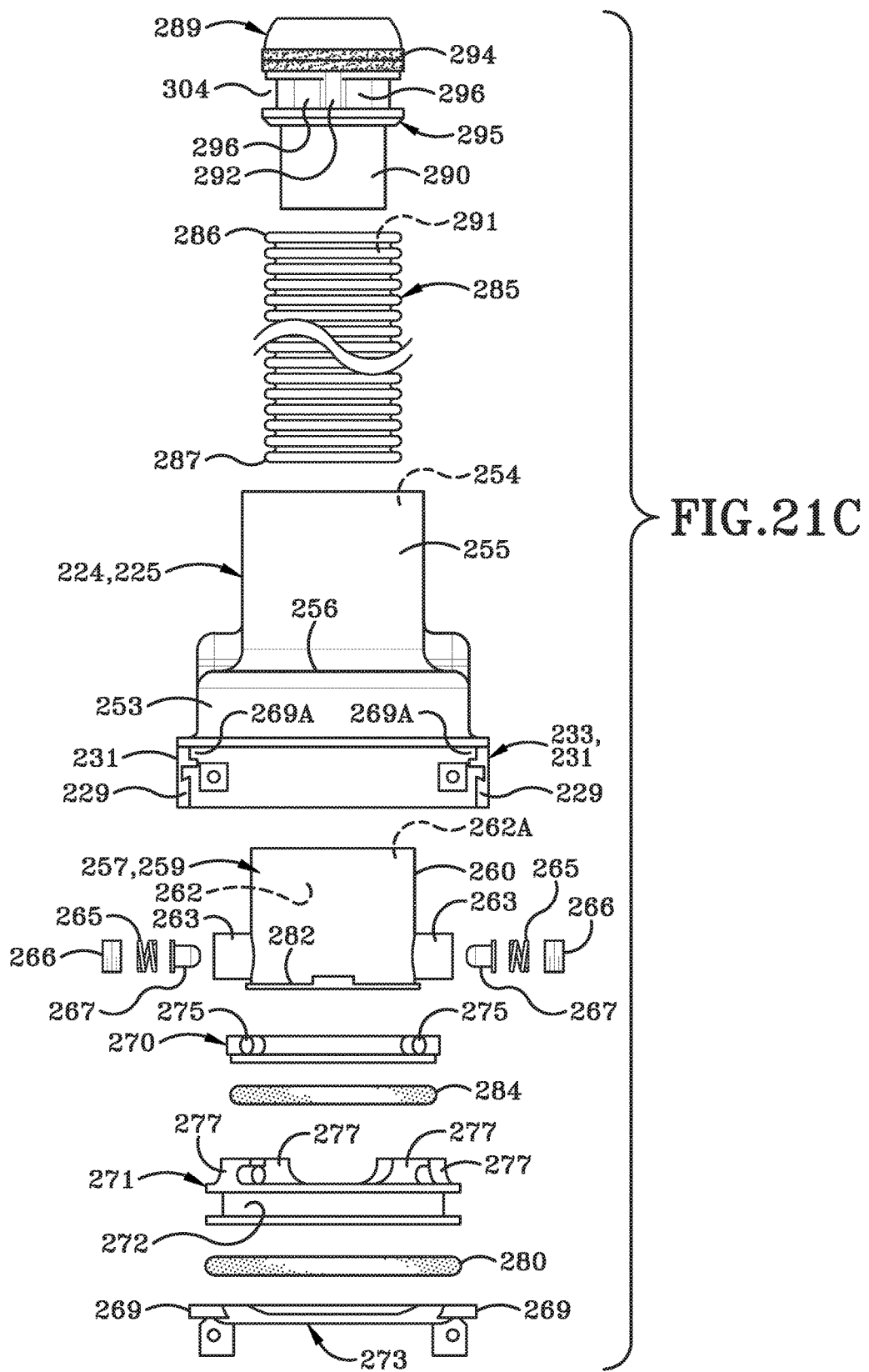

CENTRAL VACUUM SYSTEM AND INLET VALVES THEREFOR

CROSS REFERENCE TO RELATED APPLICATIONS

This application is a continuation-in-part application of U.S. patent application Ser. No. 14/570,159, filed Dec. 15, 2014, which claims the benefit of U.S. Provisional Patent Application Ser. No. 61/923,949, filed Jan. 6, 2014; the disclosures of which are entirely incorporated herein by reference.

This application also claims the benefit of U.S. Provisional Patent Application Ser. No. 62/457,558, filed Feb. 10, 2017; the disclosure of which is entirely incorporated herein by reference.

BACKGROUND

Technical Field

The invention relates to a central vacuum cleaning system, including inlet valves therefor which can be mounted on a structure in a variety of positions and connected to the inlet end of a vacuum conduit for holding the handle of a vacuum cleaning hose which is slidably mounted within the conduit when the hose is in a retracted position, and which seals the outlet end of a debris pickup nozzle handle and the vacuum conduit enabling the inlet valve to be of an open non-sealed construction and used in multiple inlet valve cleaning systems, and which provides a locking mechanism for releasably securing the hose in an extended condition from the conduit.

Background Information

Central vacuum systems for home and commercial use have been used for many years, examples of which are shown in U.S. Pat. Nos. 2,943,698 and 3,173,164. These systems generally are comprised of a main vacuum source which is usually mounted in the basement or other locations in the structure or closely adjacent thereto. The vacuum source is connected to various dedicated inlet valves in the structure by conduits or tubing. These inlet valves, also referred to valve boxes in the industry, are mounted in a wall, inside of a cabinet or in and on other structures by various types of flanges, brackets etc. Some examples are shown in U.S. Pat. Nos. 2,953,806, 3,520,725, 4,336,427, 6,459,056, and 7,624,472.

More recently, many of these vacuum systems use a hose that is slidably moveable and contained within the vacuum conduit and expandable therefrom, so that the hose is pulled from the conduit for cleaning an area and then retracted back into the vacuum conduit for storage after use. Some examples of such systems are shown in U.S. Pat. Nos. 2,953,806, 7,010,829, and 8,001,650. These systems have a handle or debris pickup nozzle which is attached to the end of the hose and which is retained in or stored closely adjacent to the inlet valve or on other types of supporting brackets or cradles when not in use, such as shown in the above-mentioned patents. Also, some of these prior art systems and inlet valves are provided with some type of locking mechanism to secure the hose in an extended position such as shown by the manually actuated locking mechanism of U.S. Pat. No. 7,010,829 or an external locking loop as shown in U.S. Pat. No. 8,590,098.

Heretofore, these inlet valves or valve boxes are sealed from the ambient atmosphere by a relatively air-tight box and closure door to seal the vacuum from the surrounding atmosphere. This air-tight sealing arrangement for the stored nozzle enables the vacuum system to be maintained operational for other inlet valves located throughout the structure which are also connected to the same vacuum source by the rigid tubing or flexible conduits. This air-tight sealing arrangement is necessary to maintain the vacuum operational throughout the system, but requires a more complicated and expensive inlet valve box than desirable for many applications and installations.

Thus, it is desirable to provide an inlet valve which can be open to the surrounding atmosphere in which the debris pickup nozzle is stored when not in use, which enables the other inlet valves of the vacuum cleaning system throughout the structure to be operational, and which will eliminate any noise or other problems that are associated with such prior art sealed inlet boxes.

Central vacuum cleaning systems also are becoming popular in recreational vehicles and camping trailers. However, one problem is that space is very limited and it is difficult to install the rigid type of vacuum supply conduits as used in most residential and commercial buildings. Furthermore, storage space for the cleaning hose and nozzle handle attached to the inlet end thereof is at a premium in these RVs. Also it is difficult to find an area within the RV to secure the handle when not in use as well as sealing the inlet end of the conduit when used in multiple vacuum inlets within the RV. Although prior art pneumatic systems for structures and RVs with an associated locking mechanism perform satisfactory, they require numerous components and are difficult to mount in a variety of locations and on available structures.

SUMMARY

In one aspect, the present disclosure may provide An inlet valve for mounting on a structure and connected to a conduit of a vacuum cleaning system comprising: a body formed with a bore with inner and outer open ends, said inner open end adapted to be connected with the conduit of the central vacuum cleaning system; a length of flexible hose adapted to be slidably mounted within the conduit and expandable from and retractable within the conduit and moveable through the bore of the body and through the outer open end, said hose having a nozzle end and a distal end; a handle mounted on the nozzle end of the hose, said handle having an open end for picking up debris from an adjacent area; a first seal mounted in the body and engageable with the handle when the hose is in a retracted position in the conduit and the handle is in a stored position in the body to provide a substantially air-tight seal between the handle and vacuum conduit; and a second seal for sealing the open end of the handle when the handle is in the stored position in the body, said first and second seals sealing the conduit and open end of the handle from the ambient atmosphere at the inlet valve.

In another aspect, the present disclosure may provide in combination, a length of flexible hose having a nozzle end and a distal end adapted to be slidably received in a conduit of a central vacuum cleaning system; and an inlet valve box for storing a handle mounted on the nozzle end of the hose when the handle is in a stored position within the inlet valve box; said valve box including: a housing having a front opening through which the hose is extendable and retractable, said housing having a lower portion including a plurality of walls forming an interior chamber open to the ambient atmosphere; a first seal mounted within the lower portion of the housing for sealing engagement with an open end of the handle when the handle is in a stored position in the interior chamber; a second seal mounted in an upper portion of the housing for sealing engagement with the handle when the handle is in the stored position; and said first and second seals sealing the open end of the handle and the conduit from the ambient atmosphere at the inlet valve box.

BRIEF DESCRIPTION OF THE SEVERAL VIEWS OF THE DRAWINGS

Various embodiments of the invention are set forth in the following description, are shown in the drawings and are particularly and distinctly pointed out and set forth in the appended claims. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4C is a fragmentary exploded view of the nozzle handle and internal hose in combination with the sealing rings and flared end component of the locking collar.

FIG. 20A is an exploded side elevational view showing many of the components in the lower portion of the valve box of FIGS. 19 and 20.

FIG. 21A is an exploded front elevational view of many of the components in the lower portion of the valve box as shown in FIG. 20A.

FIG. 21B is a front elevational view of the closure door and door mounting flange of the valve box as shown in FIG. 20A.

FIG. 21C is an exploded elevational view of the upper components of the valve box and distal end of the vacuum hose as shown in FIG. 20B.

Similar numbers refer to similar parts throughout the drawings.

DETAILED DESCRIPTION

Figure 1:
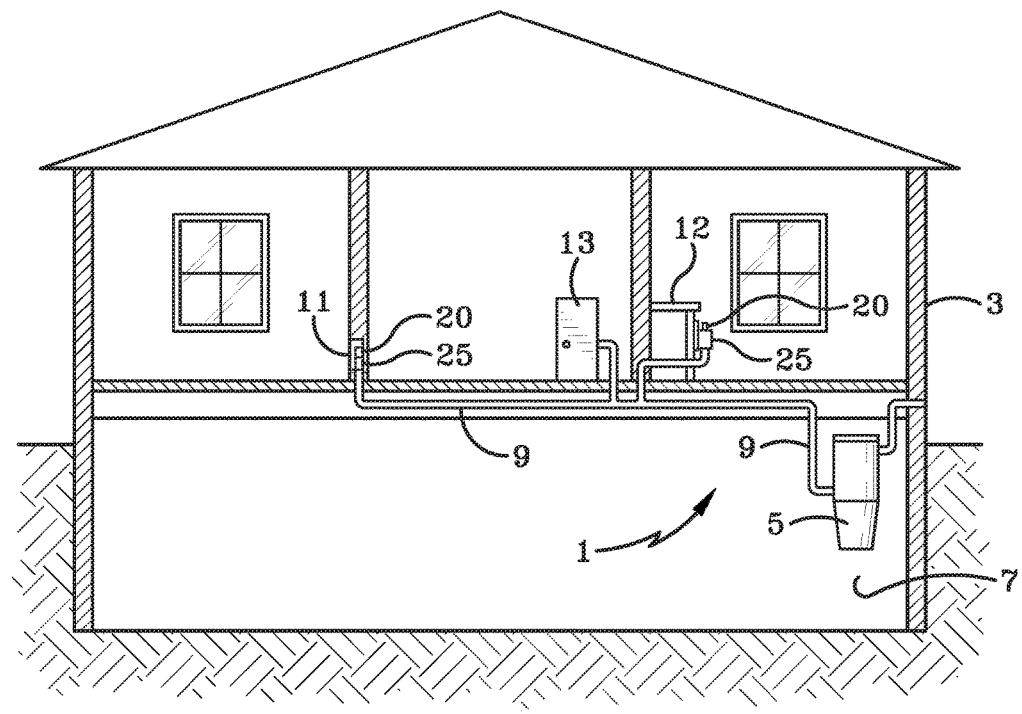
FIG. 1 is a diagrammatic view showing a structure having a central vacuum source in the lower level thereof connected to various inlet valves of the present disclosure located within the structure.

One example of a central vacuum cleaning system in which an inlet valve of the present disclosure is located is indicated generally at 1, and is shown in FIG. 1. A central vacuum source 5 is located within a usual structure 3 such as in a lower level 7. However, vacuum source 5 could be located at other locations in the structure or outside closely adjacent thereto. A plurality of vacuum source tubes or conduits 9 extend from vacuum source 5 to various locations or rooms within structure 3. The number of conduits will depend upon the size of the house, number of rooms, size of vacuum source 5, and other factors. These vacuum supply conduits are usually formed of rigid plastic and terminate at various inlet valves in the structure, three of which are shown in FIG. 1.

One of the vacuum supply conduits terminates at a usual air-tight wall valve 11, whereas another supply conduit terminates at a similar valve in a wall storage cabinet 13, with another supply conduit terminating at a first embodiment of the inlet valve of the present disclosure which is indicated generally at 25 and shown mounted under a counter 12. It is also readily understood that conduits 9 could extend into various locations within the structure and attached to other types of inlet valves without affecting the concept of the invention.

Figure 1A:
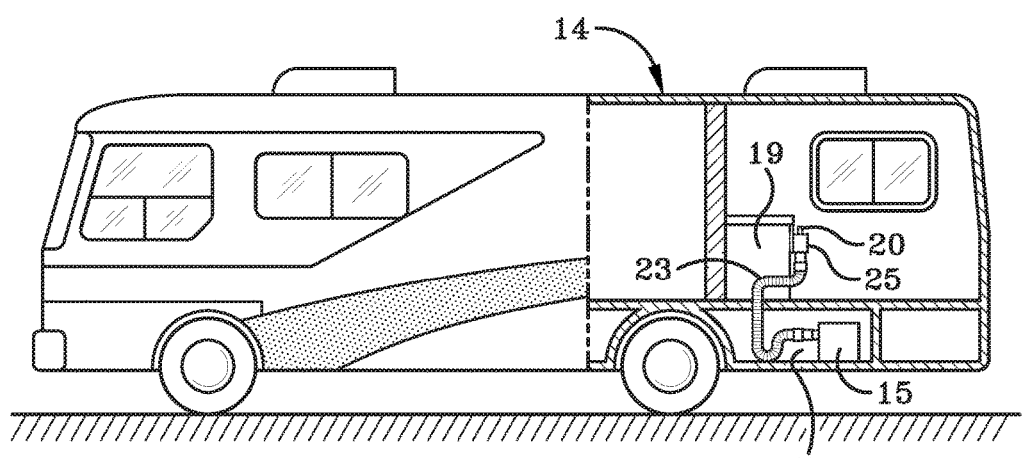
FIG. 1A is a diagrammatic view showing the central vacuum cleaning system and one of the inlet valves of the present disclosure comprised principally of a locking collar mounted within a recreational vehicle.

FIG. 1A illustrates the first inlet valve 25 of the present disclosure hereinafter referred to as a locking collar, installed in a recreational vehicle (RV) 14. Locking collar 25 is well suited for use in such a confined area such as an RV. In this type of vacuum system, a usual vacuum power supply 15 is located in a storage area 17 with inlet valve or collar 25 being located in a cabinet 19 or other easily accessible location within the RV. Preferably in an RV the vacuum supply conduit will be a flexible hose 23 in place of rigid conduits 9 of FIG. 1, enabling it to be installed to conform to the available space and contours of an RV when space is at a premium. Although FIG. 1A shows only a single inlet valve or collar 25, it is readily understood that the RV can have multiple inlet valves throughout the vehicle all connected to vacuum source 15.

Figure 2:
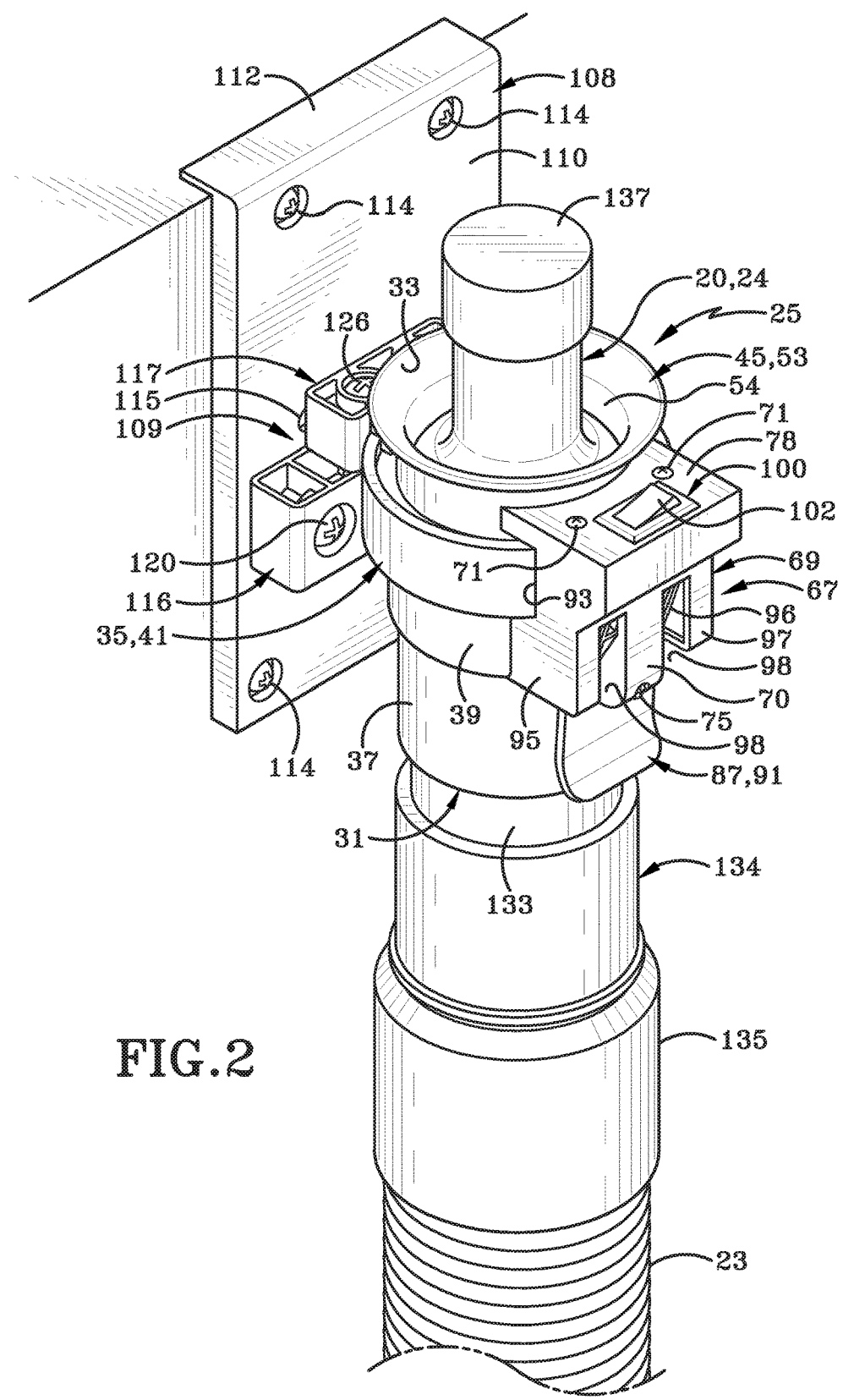
FIG. 2 is a top perspective view showing one of the inlet valves of the present disclosure which is a unique locking collar mounted on a supporting structure with the cleaning hose in a fully retracted position within a flexible outer conduit as shown in FIG. 1A, and with an end sealing cap mounted on the open end of the nozzle handle.
Figure 2A:
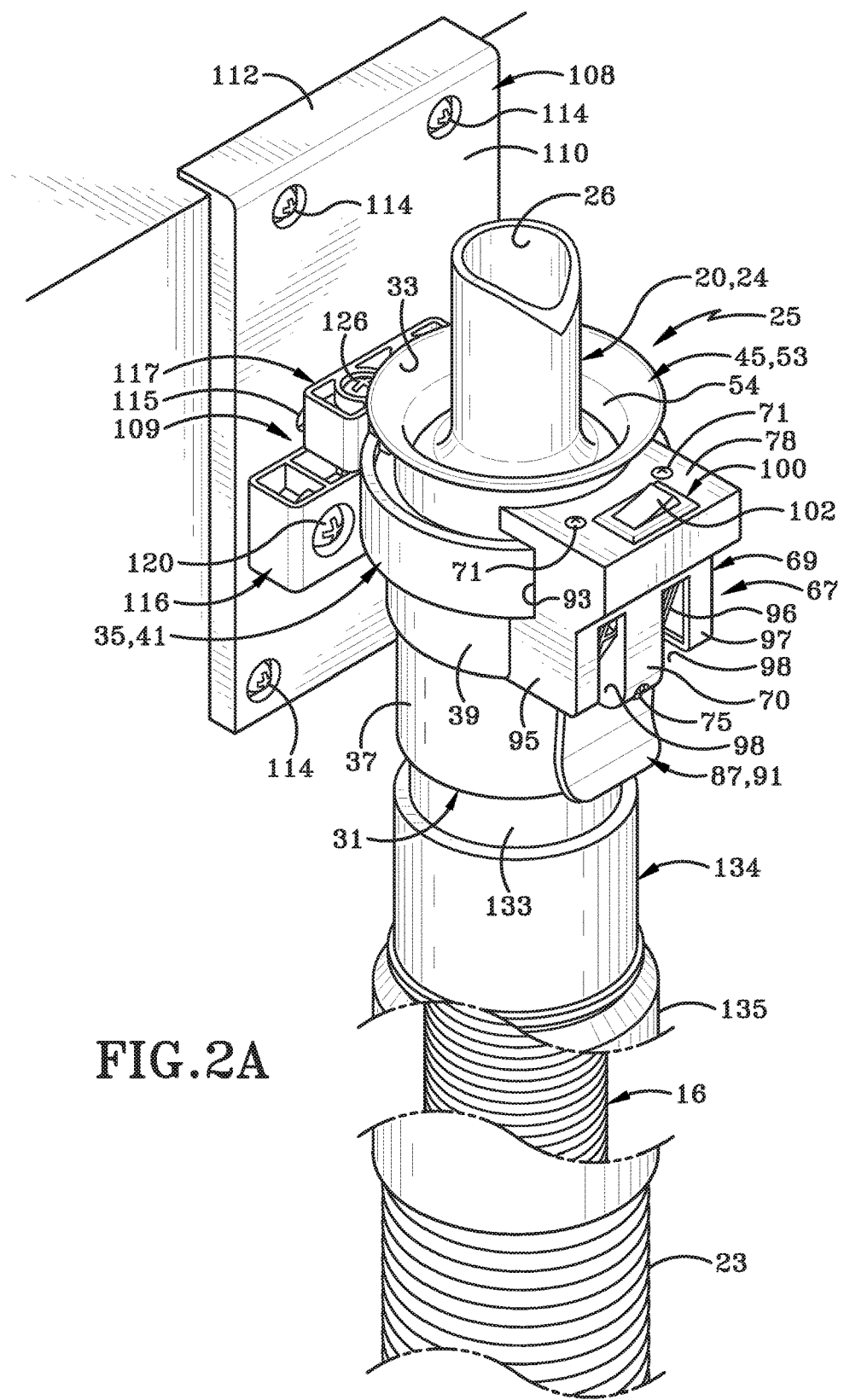
FIG. 2A is a top perspective view similar to FIG. 2 with portions broken away showing the locking collar of the present disclosure without the sealing end cap.
Figure 3:
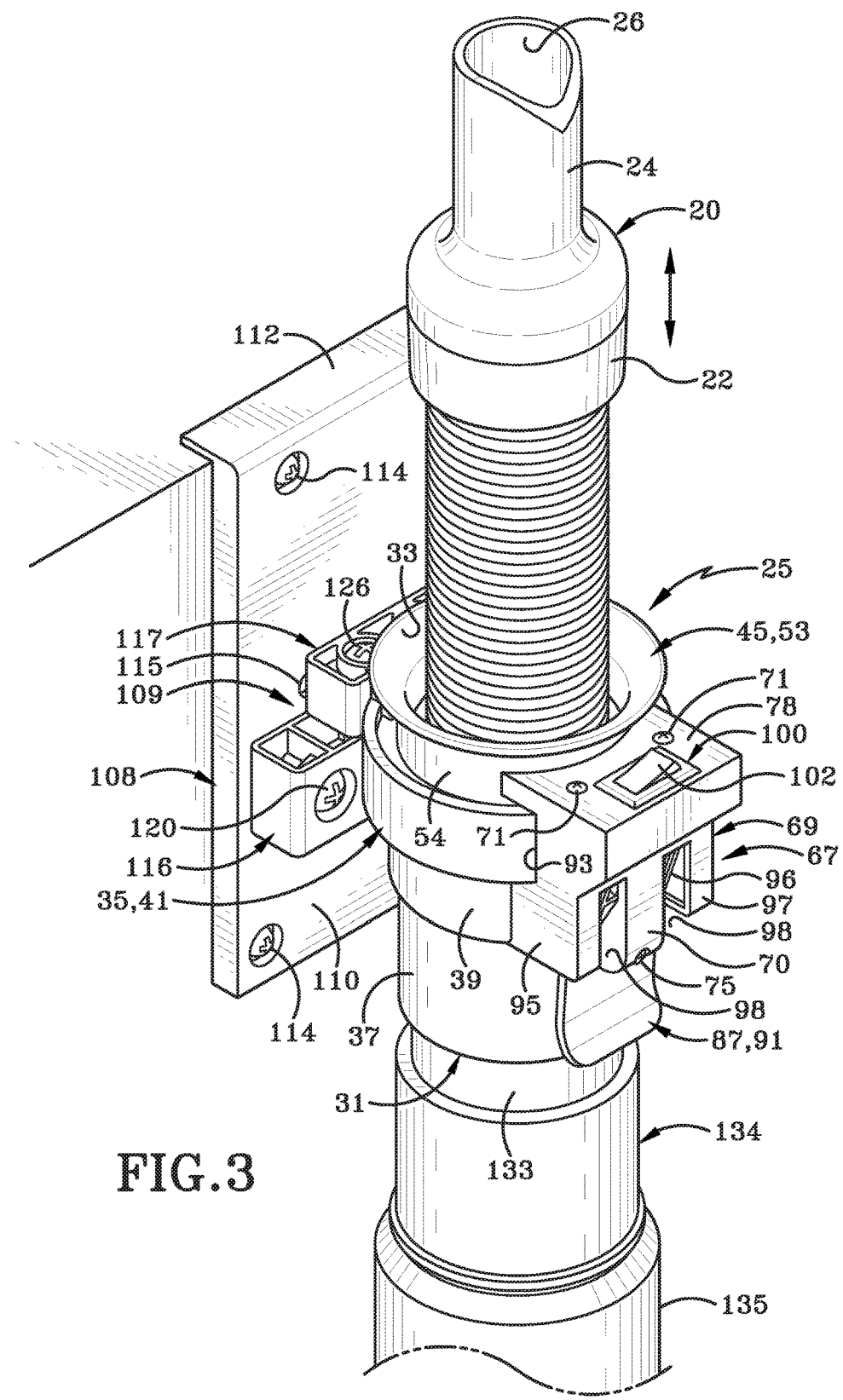
FIG. 3 is a top perspective view similar to FIG. 2 showing the nozzle handle removed from the locking collar and the internal hose in a partially extended position.
Figure 14:
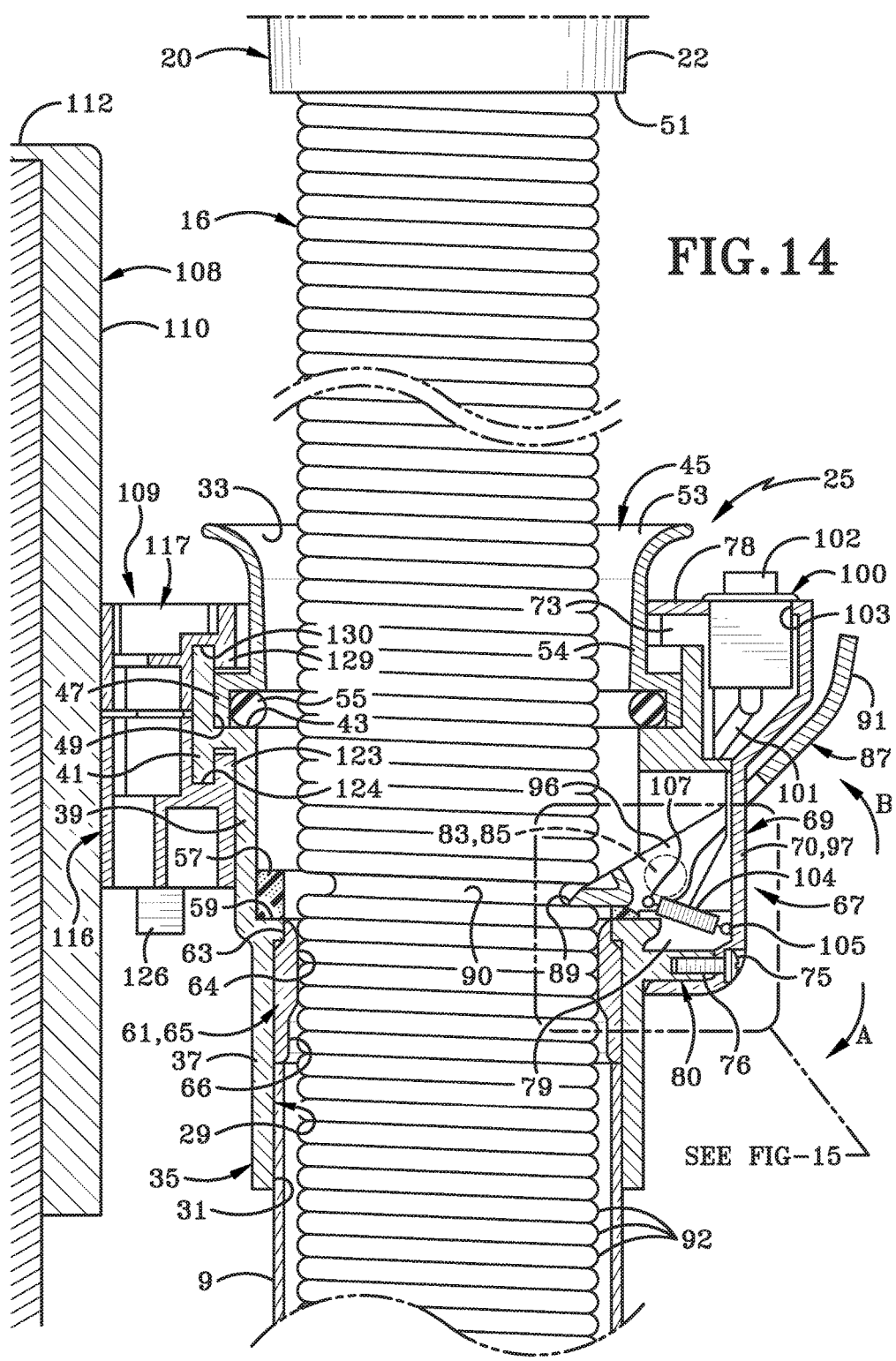
FIG. 14 is a view similar to FIG. 12 showing the locking finger in locking engagement with the retractable hose when the hose is in a partially extended position.

As shown in FIGS. 2, 2A and 3, the vacuum supply conduit is shown as a flexible hose 23 and in FIGS. 5-17 it is shown as a rigid conduit 9 for illustrative purposes. A section of a flexible hose 16 will be contained within each of the conduits 9 and 23 and will have a nozzle handle 20 attached to the outer end of hose 23 for grasping by an operator for cleaning an adjacent area. Collar 25 of the present disclosure and the main components thereof are shown in detail in FIGS. 4A, 4B, and 4C. Collar 25 preferably is molded of plastic, although it could be formed of metal without affecting the concept of the invention. Collar 25 is formed with a through bore or passage 29 which terminates in an open inner end 31 and an open outer end 33 (FIGS. 12 and 14). Collar 25 includes a main body 35 which has a cylindrical end section 37 and a larger diameter cylindrical central section 39 which terminates in an annular upper ring 41 connected to central section 39 by an annular shoulder 43.

An annular end section or collar, indicated generally at 45 (FIGS. 4C and 12), terminates in an inner right angle shoulder 47 which is slidably received within and against the inside surface 49 of annular ring 41 and sets upon annular shoulder 43 of central section 39. Shoulder 43 is formed at the junction of the upper portion of annular ring 41 and the top end of central section 39. End collar 45 terminates in an outwardly flared end flange 53 which guides the handle 20 into the collar body when the hose is moving toward a stored position. Flange 53 forms the open outer end 33 of the locking collar and has a smooth inner cylindrical wall 54 which forms a through bore of end collar 45.

An O-ring 55, formed of a rubber or some type of resilient material, is located between step shoulder 47 of end collar 45 and annular shoulder 43 of central section 39. Ring 55 has an inner diameter generally complementary to the inner diameter of end collar 45 and provides a frictional sliding fit with handle 20 to assist in retaining handle 20 within body 35 when in its stored position. A sealing ring 57 formed of a resilient material such as rubber, felt or a foam material, is seated upon an annular shoulder 59 formed between central section 39 and cylindrical end section 37. Ring 57 provides an air seal with the annular bottom edge 51 of handle 20 when the handle is in its stored position as shown in FIG. 12.

An annular hose stop, indicated generally at 61 (FIGS. 4A, 12 and 17), terminates in an inwardly curved upper shoulder 63 and a main cylindrical body 65 which terminates in a larger diameter section 66 and a smaller internal diameter 64. Hose stop 61, as shown particularly in FIG. 12, is slidably received in the internal diameter of cylindrical end section 37 with the stepped upper shoulder 63 engaging shoulder 59 to properly position stop 61 within the interior of end section 37. Hose stop 61 prevents the distal end of the hose from being pulled out of locking collar 25 if the hose is not needed for use in the other inlet valves throughout the dwelling. Ring 61 can easily be eliminated from locking collar 25 permitting easy removal of the hose therefrom without affecting the concept of the present disclosure.

Figure 4A:
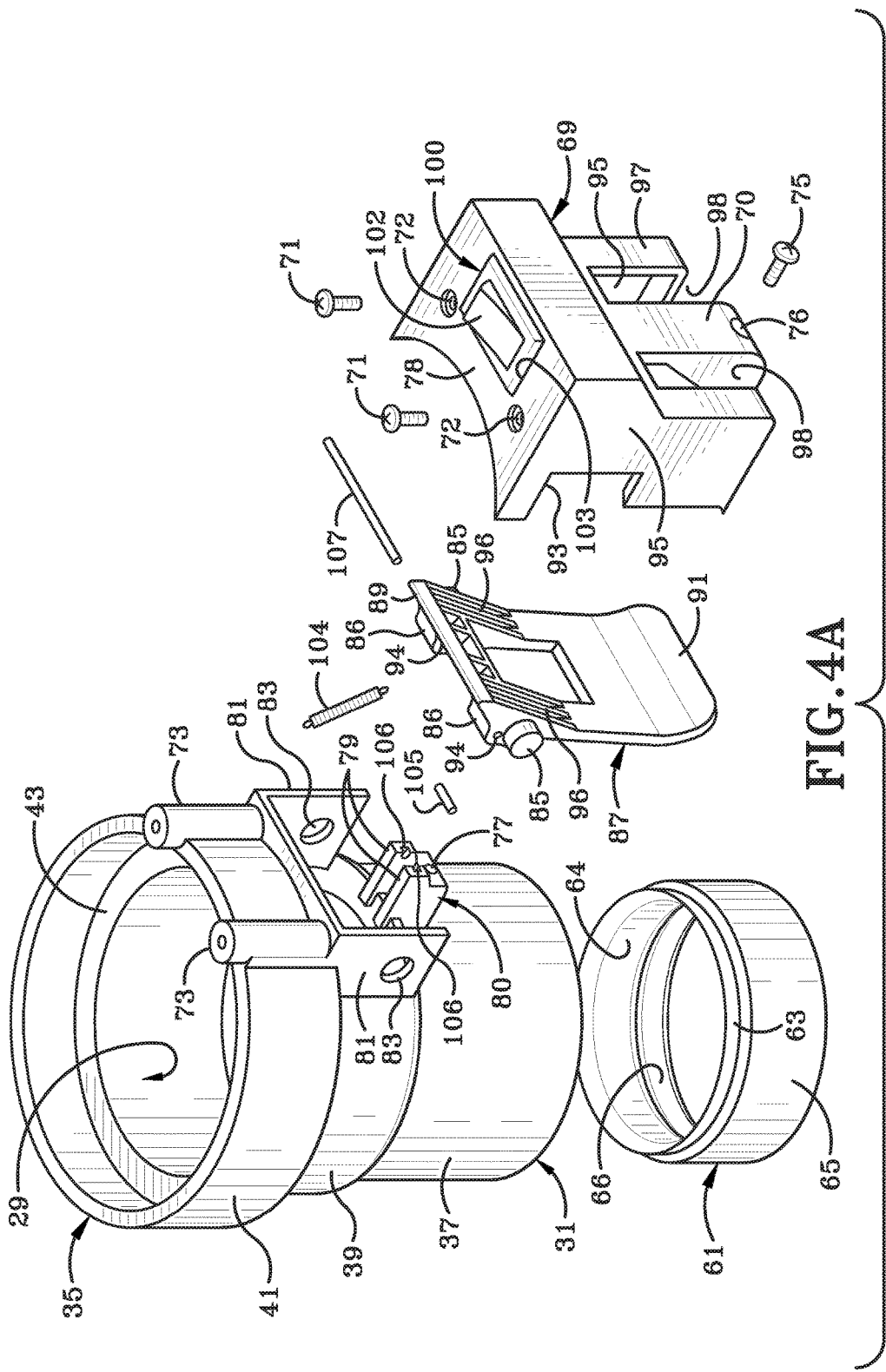
FIG. 4A is an exploded perspective view showing the lock housing, locking mechanism and hose stop components of the locking collar.

In accordance with another feature of the invention, a locking mechanism indicated generally at 67, is mounted on main collar body 35 (FIG. 4A). Locking mechanism 67 includes a lock housing 69 which is mounted on the exterior of body 35 by a pair of fasteners 71 which extend through a pair of holes 72 formed in top wall 78 and threadably engage a pair of spaced posts 73 formed integrally with annular ring 41, and by another fastener 75 which extends through a hole 76 formed in a central post 70 of lock housing 69. Fastener 75 is engaged within an opening 77 formed in the lower end of a stud 80 having a pair of spaced members 79 formed integrally with and projecting outwardly on stud 80 of central section 39.

Locking mechanism 67 furthermore includes a pair of spaced flanges 81 which are formed integrally with and extend outwardly from central section 39 of body 35. Each flange 81 is formed with a hole 83 which snap fittedly receives a pair of bosses 85 which are formed on and extend outwardly from the ends of a locking member or finger indicated generally at 87. Locking member 87 terminates in a laterally extending locking edge 89 and an opposite finger tab 91.

Figure 5:
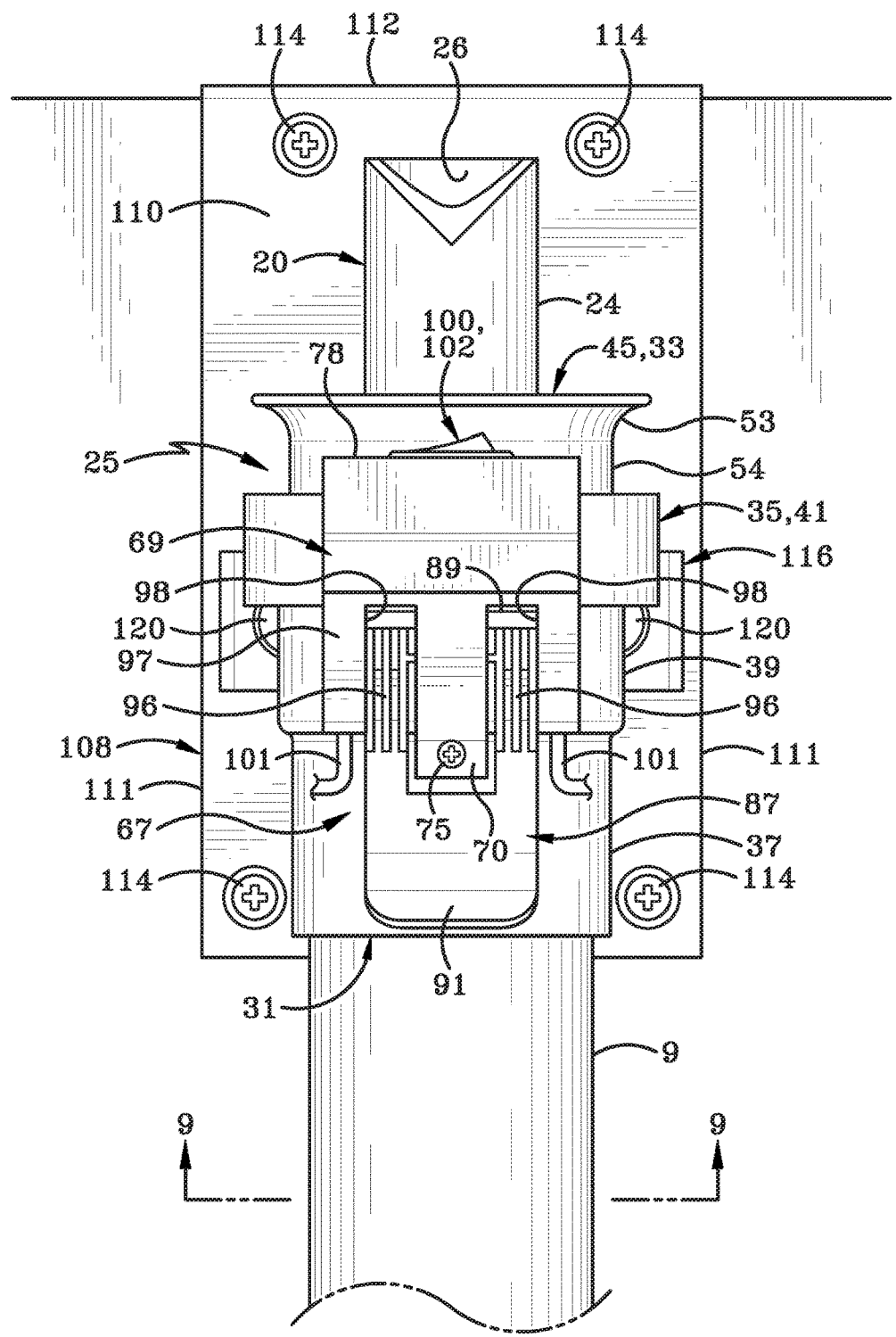
FIG. 5 is a front elevational view of the locking collar and nozzle handle with a rigid outer conduit as shown in FIG. 1, with the locking finger in the unlocked position.
Figure 6:
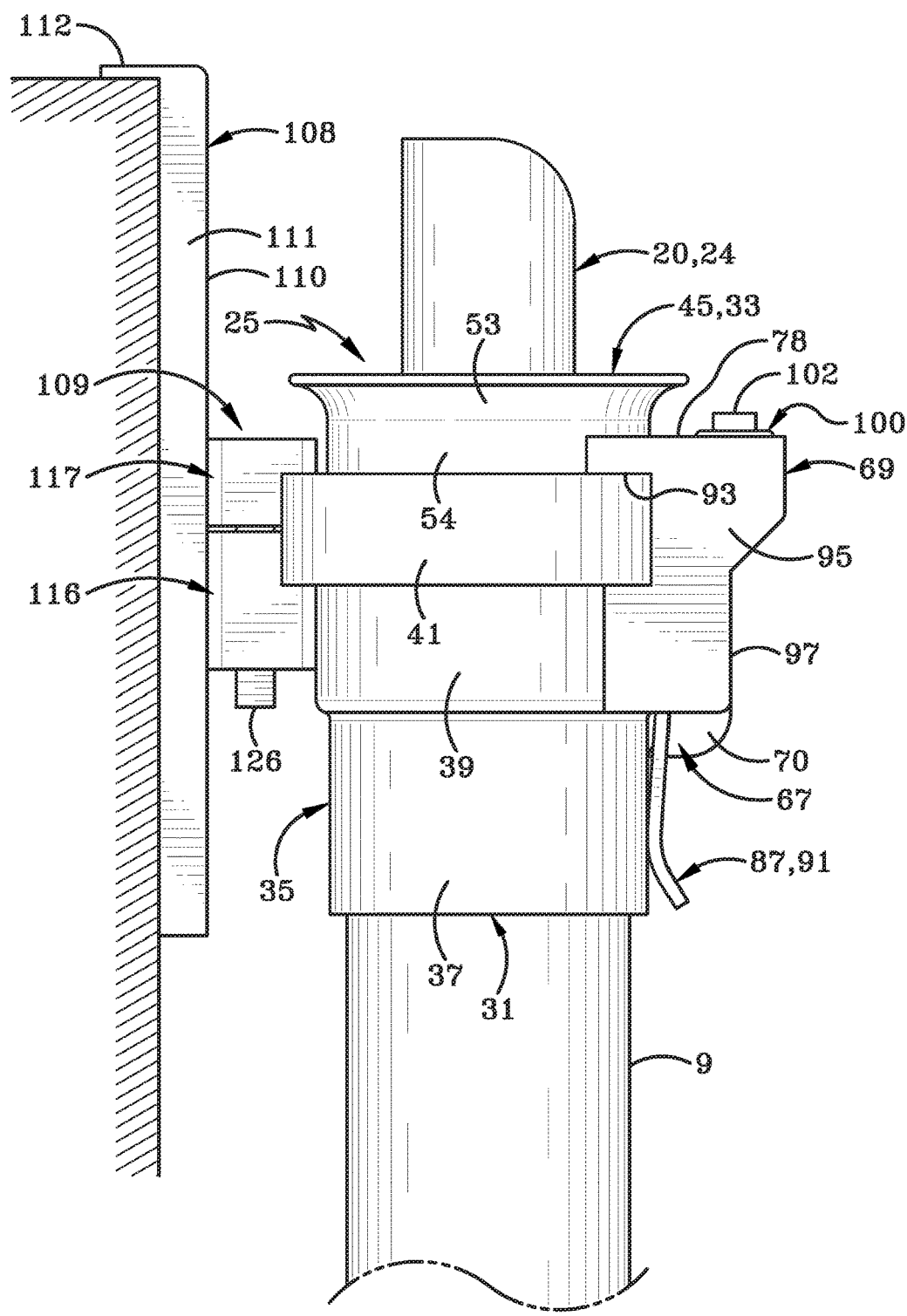
FIG. 6 is a left side elevational view of the locking collar as shown in FIG. 5.

Lock housing 69 is formed with a pair of cut-outs 93 in side walls 95 thereof which receive annular ring 41 therein when mounted on body 35 as best shown in FIG. 6. Rear wall 97 of lock housing 69 is formed with a pair of cut-outs 98 adjacent central post 70 through which spaced portions 96 of locking finger 87 extend when lock housing 69 is secured to main body 35 enabling locking finger 87 and in particular finger tab 91 thereof, to extend externally of lock housing 69 as shown in FIGS. 5 and 6.

In further accordance with the invention, an electric switch 100 is mounted within lock housing 69 and is adapted to be connected to vacuum sources 5 and 15 by electrical conductors or wires 101. Switch 100 includes an actuation toggle button 102 which extends through an opening 103 formed in a top wall 78 of housing 69.

Figure 15:
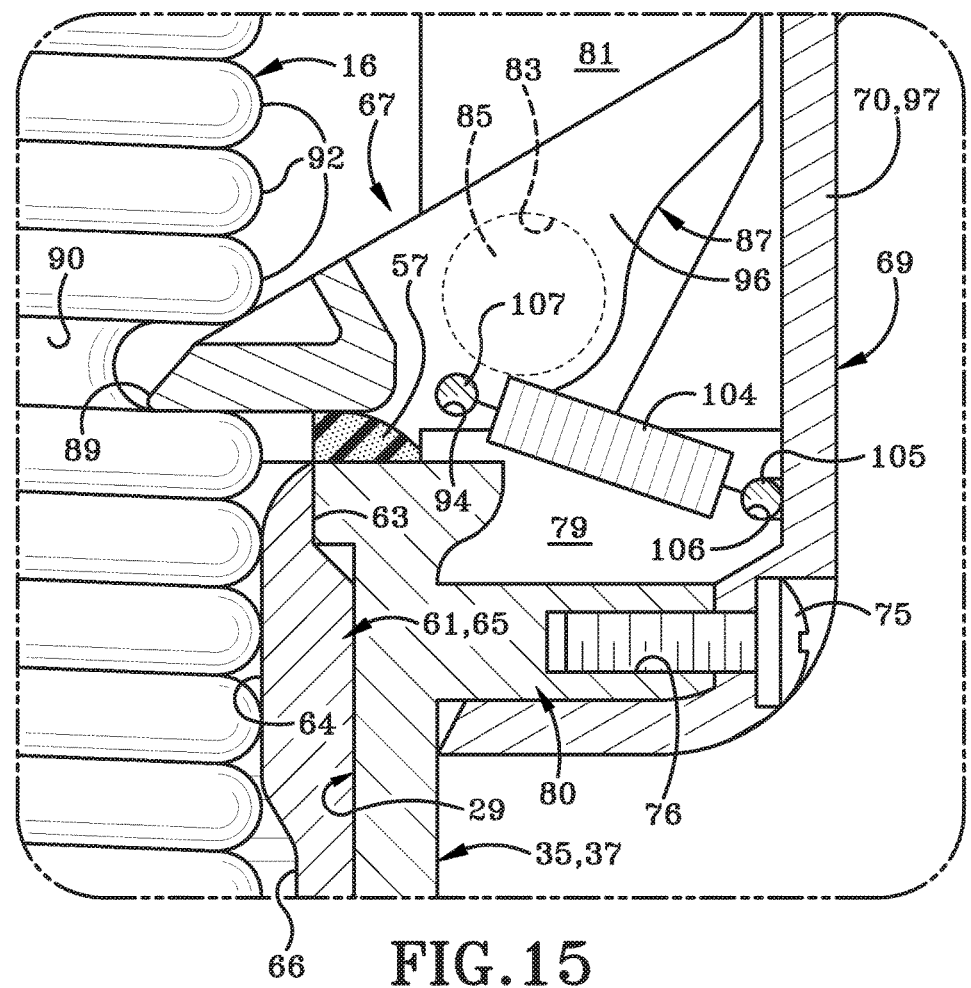
FIG. 15 is an enlarged fragmentary view of the encircled portion of FIG. 12 showing the locking finger engaged with the cleaning hose.
Figure 16:
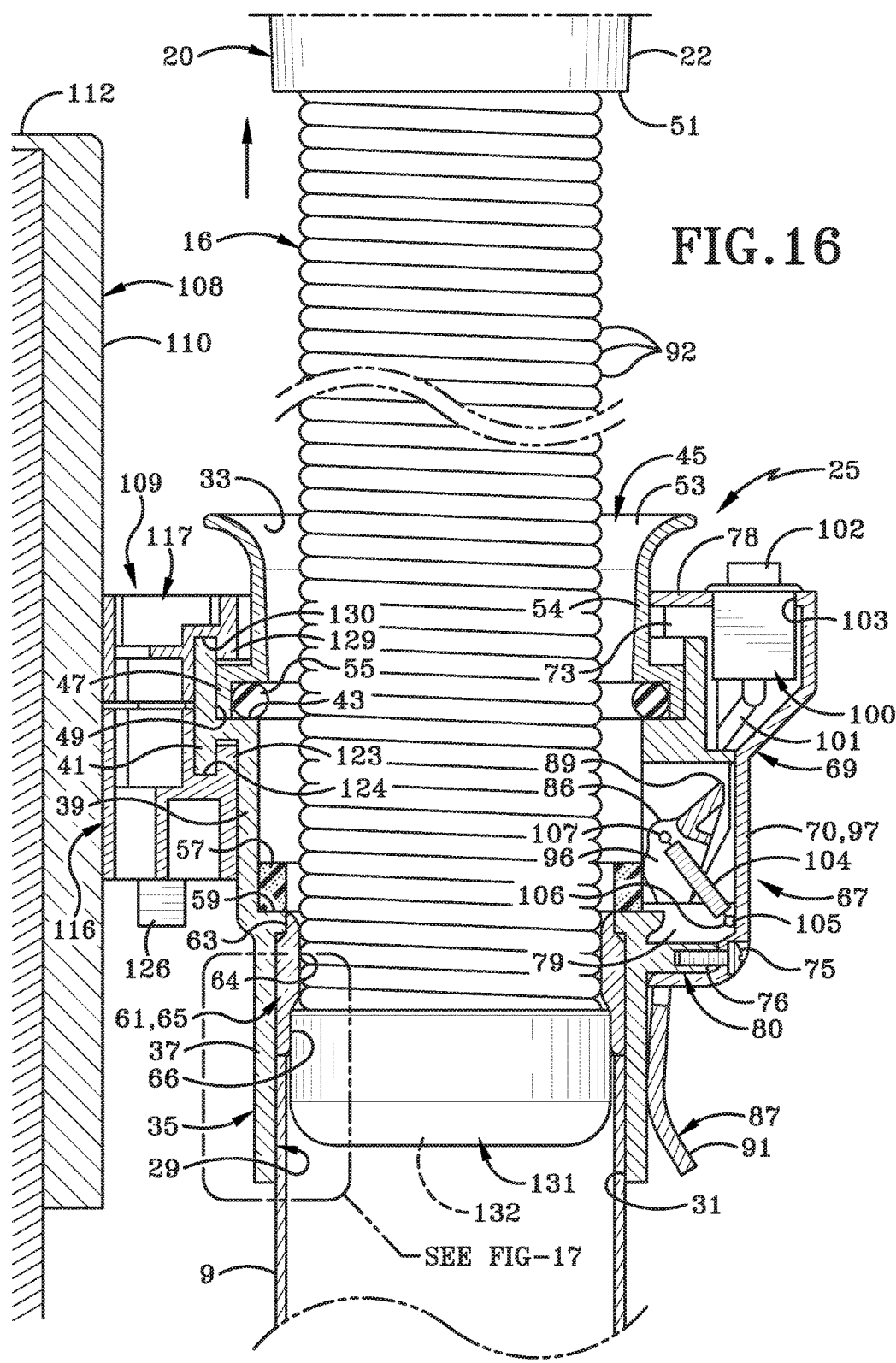
FIG. 16 is a view similar to FIG. 14 with the locking finger in its unlocked, retracted position.

Locking finger 87 is spring biased by a spring 104 toward a locking position when it is engaged with hose 16 as shown in FIG. 14 and toward an unlocked retracted position as shown in FIG. 16. Spring 104 extends between a pin 105 which is mounted within a pair of notches 106 formed at the outer ends of studs 79 (FIGS. 4A and 12) and at the opposite end to a pin 107 slidably received through a pair of openings 94 formed in a pair of lugs 86 formed on and extending outwardly on locking finger 87 generally adjacent locking edge 89. Spring 104 when in a first position biases locking edge 89 toward locking engagement with hose 16 as shown in FIGS. 14 and 15 and biases the locking finger into an unlocked disengaged position as shown in FIG. 16.

Figure 4B:
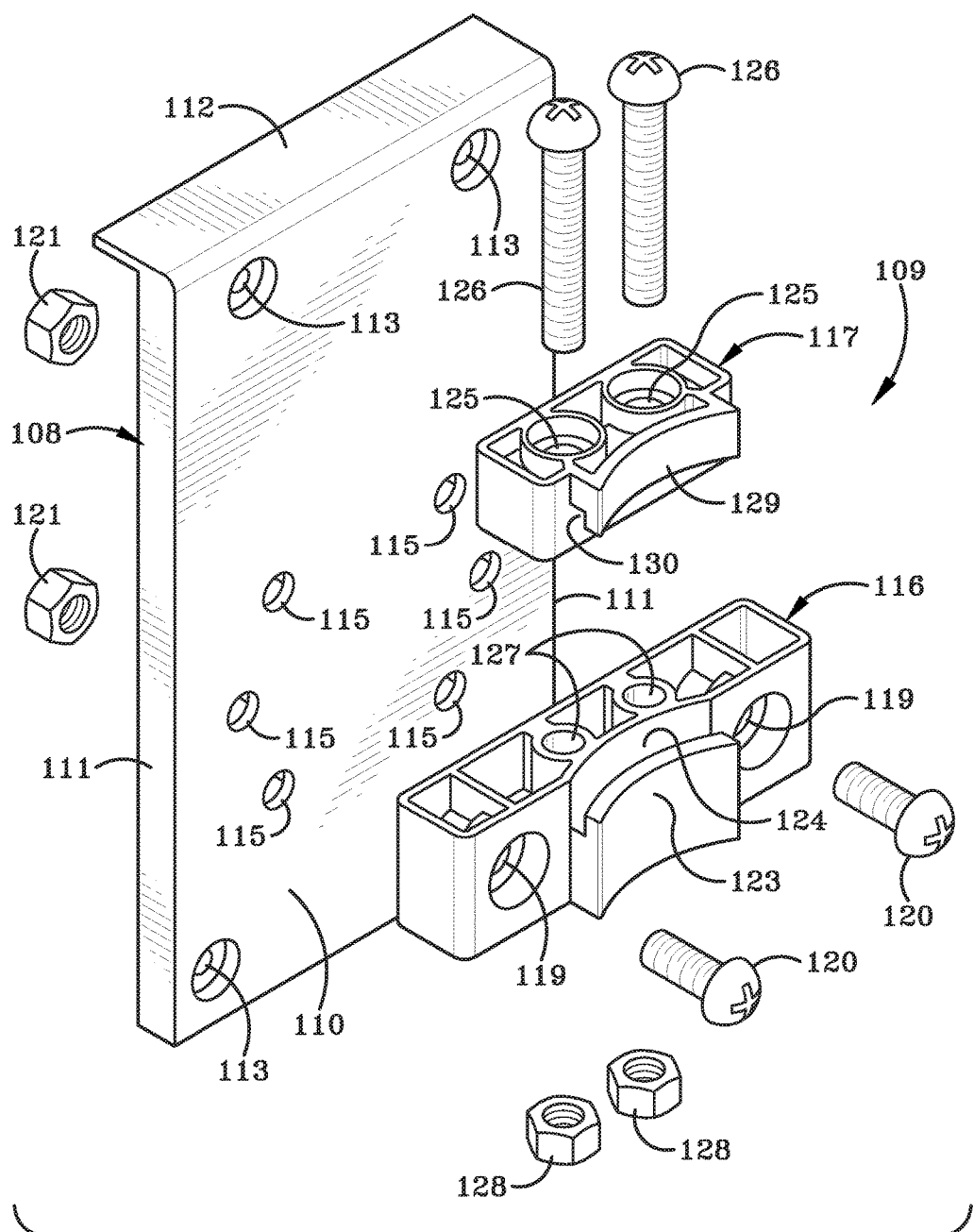
FIG. 4B is an enlarged exploded perspective view showing the locking collar mounting clamps and collar support bracket.

In accordance with another feature of the invention, locking collar 25 includes a mounting bracket indicated generally at 108 (FIGS. 4B and 7) and a clamp mechanism indicated generally at 109, for adjustably mounting body 35 onto bracket 108. Mounting bracket 108 includes a flat plate 110 formed with a pair of right angled side flanges 111 and a top ledge 112 which extends outwardly beyond end flanges 111. Four mounting holes 113 are formed generally adjacent the four corners of plate 110 for receiving fasteners (not shown) for securing bracket 108 to a supporting structure. Holes 113 can be counter-bored as shown in FIG. 4B so that the fastener heads are generally flush with the surface of plate 110 when bracket 108 is secured to a supporting structure.

Figure 7:
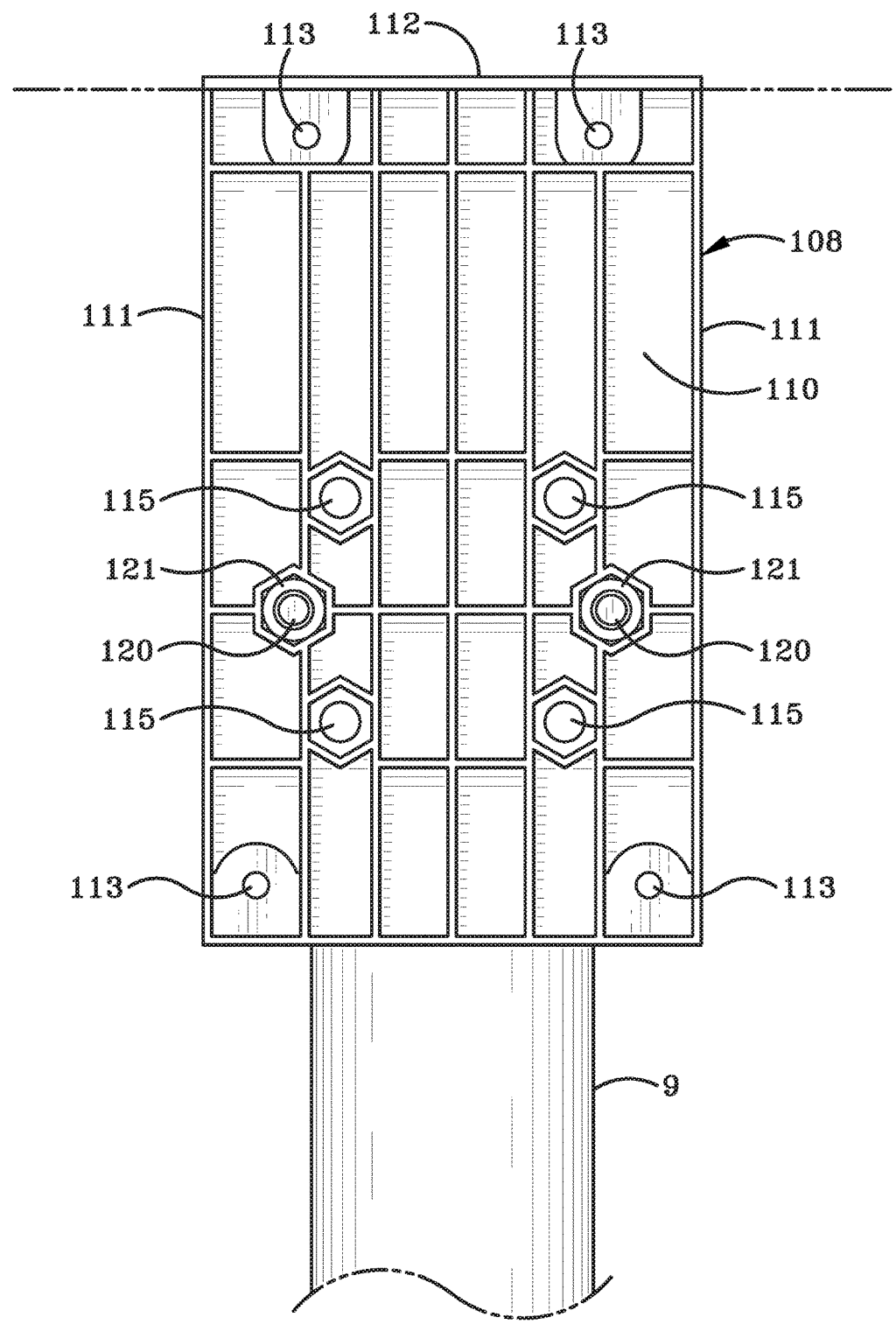
FIG. 7 is a rear elevational view of the mounting bracket attached to the locking collar.

A plurality of holes 115, six are shown in the drawings, are formed through plate 110 for adjustably mounting a pair of clamp members 116 and 117 thereon as discussed below which form clamp mechanism 109. Clamp members 116 and 117 have a generally rectangular configuration with bottom clamp 116 being formed with a pair of holes 119 for receiving a pair of fasteners 120 which project through a selected pair of holes 115 formed in plate 110 and secured thereon by a pair of nuts 121 as shown in FIGS. 4B and 7. Lower clamp body 116 is formed with an arcuate projection 123 forming an arcuate slot or channel 124 with the front surface of clamp 116.

Upper clamp 117 is formed with a pair of holes 125 for receiving a pair of bolts 126 therethrough which extend through aligned holes 127 formed in lower clamp 116 for securing engagement with a pair of nuts 128 for clamping clamp members 116 and 117 together. Upper clamp 117 is formed with an arcuate projection 129 which forms an arcuate slot or channel 130 between projection 129 and the body of upper clamp 117. When clamp bodies 116 and 117 are clamped together by fasteners 126, arcuate channels 124 and 130 align and receive annular ring 41 therein, as shown in FIG. 6, to adjustably mount main body 35 on clamp mechanism 109 and subsequently on mounting bracket 108.

Handle 20 includes a cylindrical end section 22 which is attached to the end of hose 16 by a threaded engagement, adhesive, or other type of securement means to firmly attach handle 20 to the end of hose 16. Handle 20 further will include a reduced diameter nozzle end 24 terminating in an open end 26 through which dirt and other debris is collected by the vacuum imparted onto hose 16 during a cleaning operation. The opposite end of hose 16 will have an end seal 131 (FIGS. 4C and 16) secured thereto by a threaded engagement, adhesive, or other securement means.

Figure 17:
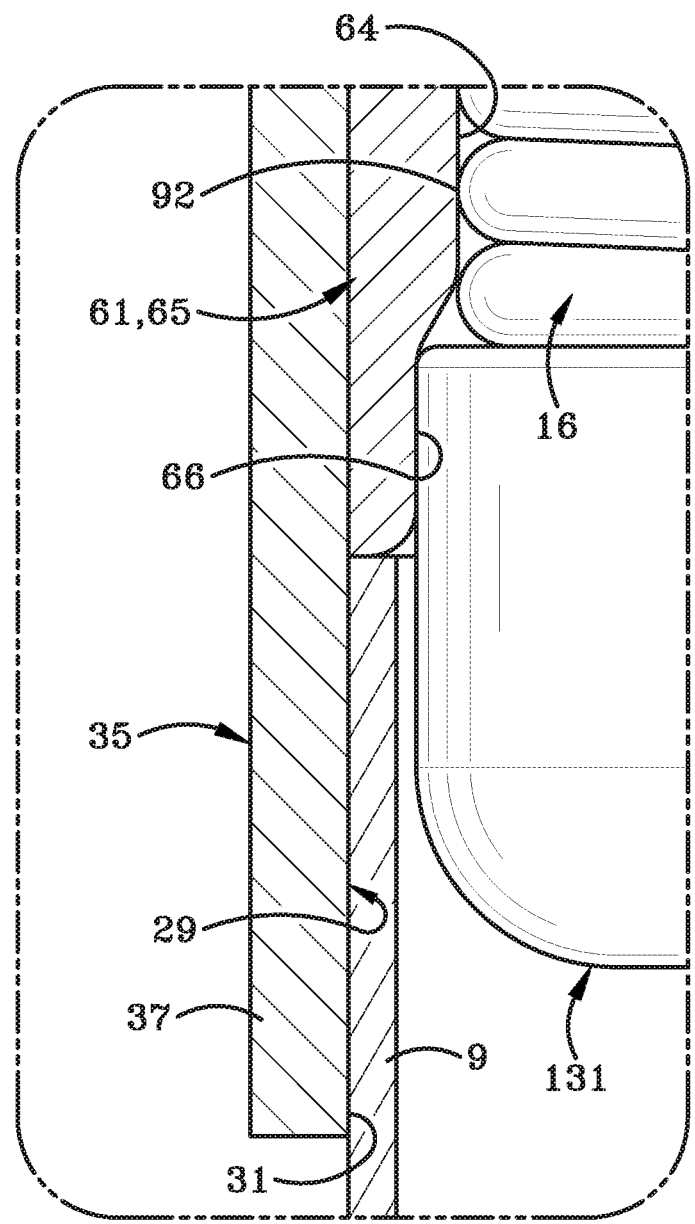
FIG. 17 is a greatly enlarged fragmentary view of the encircled portion of FIG. 16.

Hose end seal 131 is an annular ring formed having an internal bore generally complementary to the internal bore of hose 16 so as not to impede the vacuum flow. As best shown in FIGS. 16 and 17, the outer diameter of hose end seal 131 will be slightly smaller but complementary to the diameter of hose stop 61, but larger than the internal diameter of cylindrical body 65 of hose stop 61. This ensures that hose end seal 131 will not pull through locking collar 25 as shown in FIG. 16. Thus, as a user pulls hose 16 through the conduit, seal 131 will limit the outward movement of the hose by engagement of end seal 131 with the smaller diameter of hose stop 61.

FIGS. 1A, 2, 2A, 3 and 4C show collar 25 attached to a flexible conduit 23, and FIGS. 5-17 show collar 25 attached to a rigid conduit 9 for illustration purposes only. Either type of conduit will work equally well with collar 25.

As shown in FIG. 12, rigid conduit 9 is connected to locking collar 25, and in particular to main body 35 by slidingly inserting it into the end of cylindrical end section 37 where it abuts against the bottom edge of hose stop 61 pressing curved shoulder 63 thereof against annular shoulder 59. Hose stop 61 preferably is glued in position. Conduit 9 will be secured in end section 37 by an adhesive, threaded engagement, or other type of attachment well-known in the central vacuum cleaning art.

Flexible conduit 23 can be secured to locking collar 25 by a short section of rigid tube 133 and a coupler 134 preferably having a bell-shaped end 135 for receiving the end of hose 23 therein. It will also be secured by a threaded engagement, adhesive, or other type of attachment means as with rigid conduit 9. The inside diameter of conduits 9 and 23 is generally complementary to the outer diameter of hose end seal 131 in order to provide a sliding fit therebetween, as well as providing an air seal therebetween ensuring that the majority of the vacuum source is transmitted through the conduit and subsequently through the interior of hose 16 to achieve maximum dirt and debris pickup through the open end of handle 20 yet enabling hose 16 and end seal 131 to slide easily into and out of conduits 9 and 23.

Locking collar 25 is installed easily in a structure or RV by first attaching mounting bracket 108 to a support structure by fasteners 114 which can be screws, bolts, rivets, or other type of fastener depending upon the nature of the support structure to which mounting bracket 108 is attached. Preferably, top flange 112 is placed against an edge of the supporting structure to align the mounting bracket thereon and enable it to be placed in a variety of locations within a structure. Bracket flange 112 can be placed horizontally on a structure as shown in FIG. 2A or can extend vertically along a structure edge (not shown) or in various other positions for subsequent attachment of collar 25 thereon.

Figure 8:
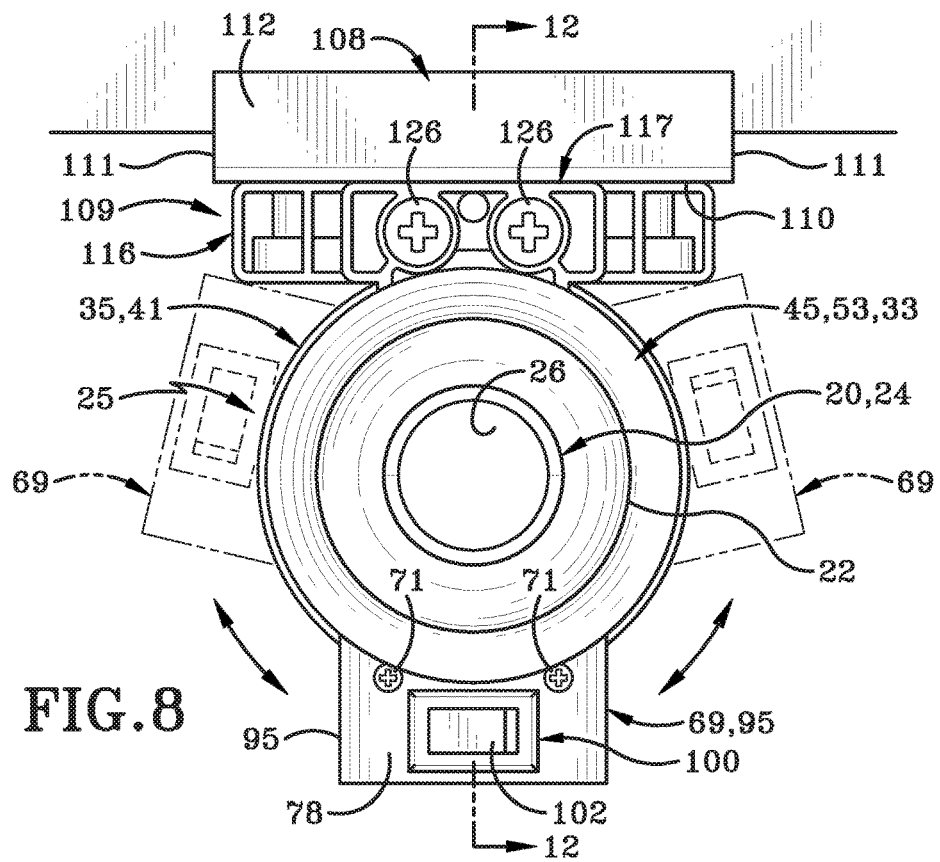
FIG. 8 is a top plan view showing the locking collar in three adjusted positions on the mounting bracket.
Figure 9:
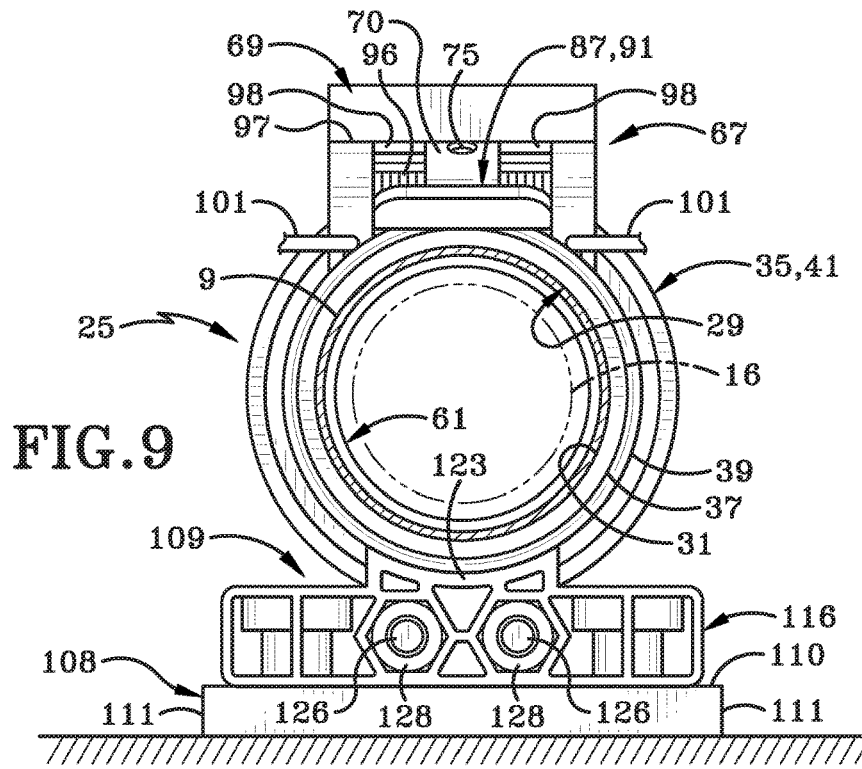
FIG. 9 is a sectional view taken along line 9-9, FIG. 5.

Lower clamp body 116 is attached to bracket plate 110 by inserting fasteners 120 through a pair of selected holes 115 and secured thereon by nuts 121. Main body 35 is mounted on lower bracket 116 by inserting the lower end of annular ring 41 within arcuate groove 124. Top body clamp 117 is placed in position with the top portion of ring 41 being seated within arcuate groove 130. Upper clamp body 117 is then secured on lower clamp body 116 by fasteners 126 and nuts 128. Initially, the clamping pressure exerted between clamp bodies 116 and 117 will be sufficient to secure ring 41 therebetween, yet loose enough to permit body 35 to be rotated with respect to mounting bracket 108 between various angular positions as shown in FIG. 8. After rotation of body 35 to the desired position, bolts 126 are then tightened to prevent further rotation of ring 41 within aligned channels 124 and 130. This feature enables body 35 to be adjusted to various angular positions on a supporting structure enabling it to be mounted at various locations and on various structures within a supporting structure, especially within an RV where spaced is limited. This adjustability will provide the best access for a user to pull handle 20 and attached hose 16 through collar 25 for a cleaning operation.

Figure 10:
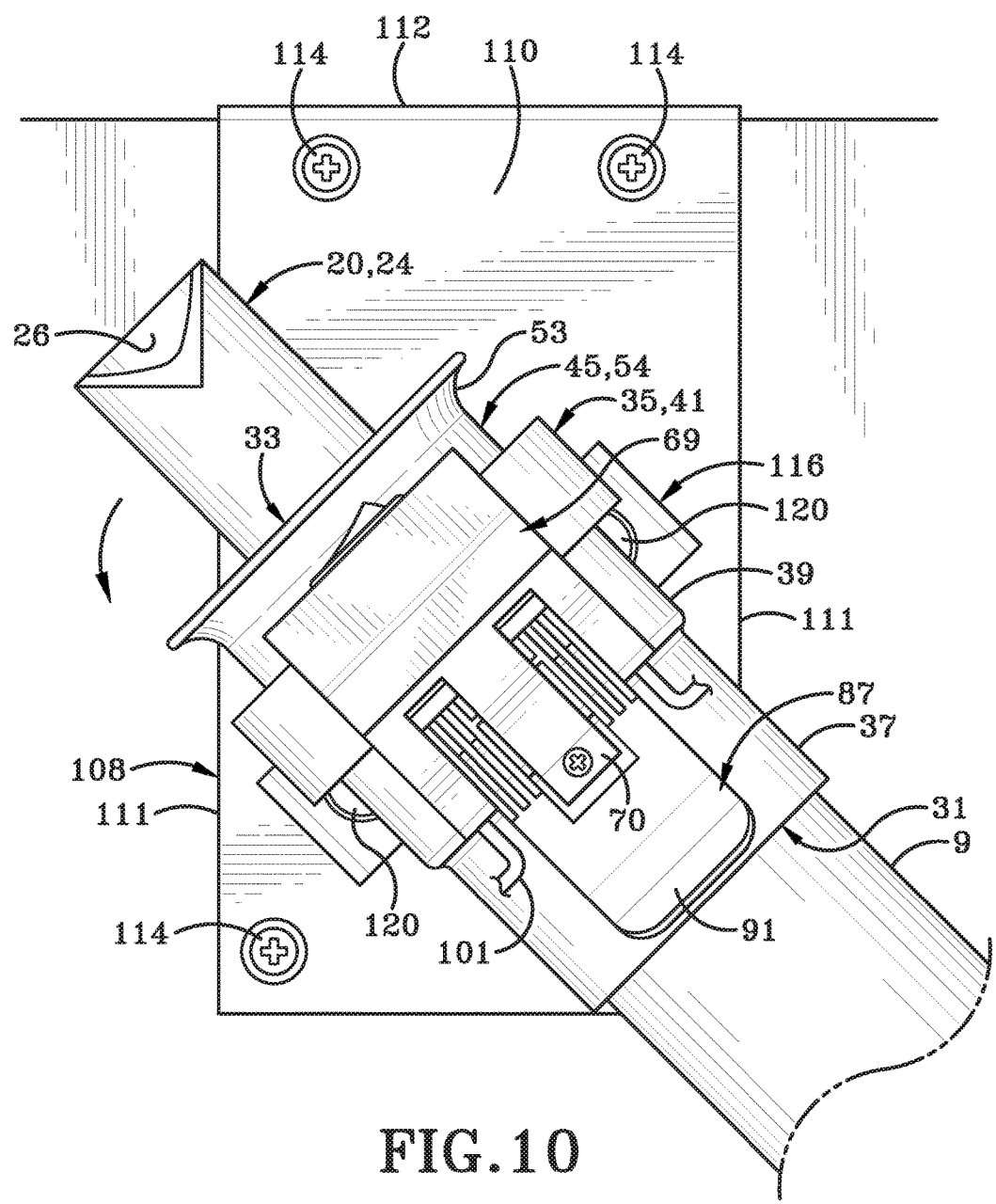
FIG. 10 is a view similar to FIG. 5 showing the locking collar and mounting clamps rotated 45° in a counterclockwise direction from its vertical position.
Figure 11:
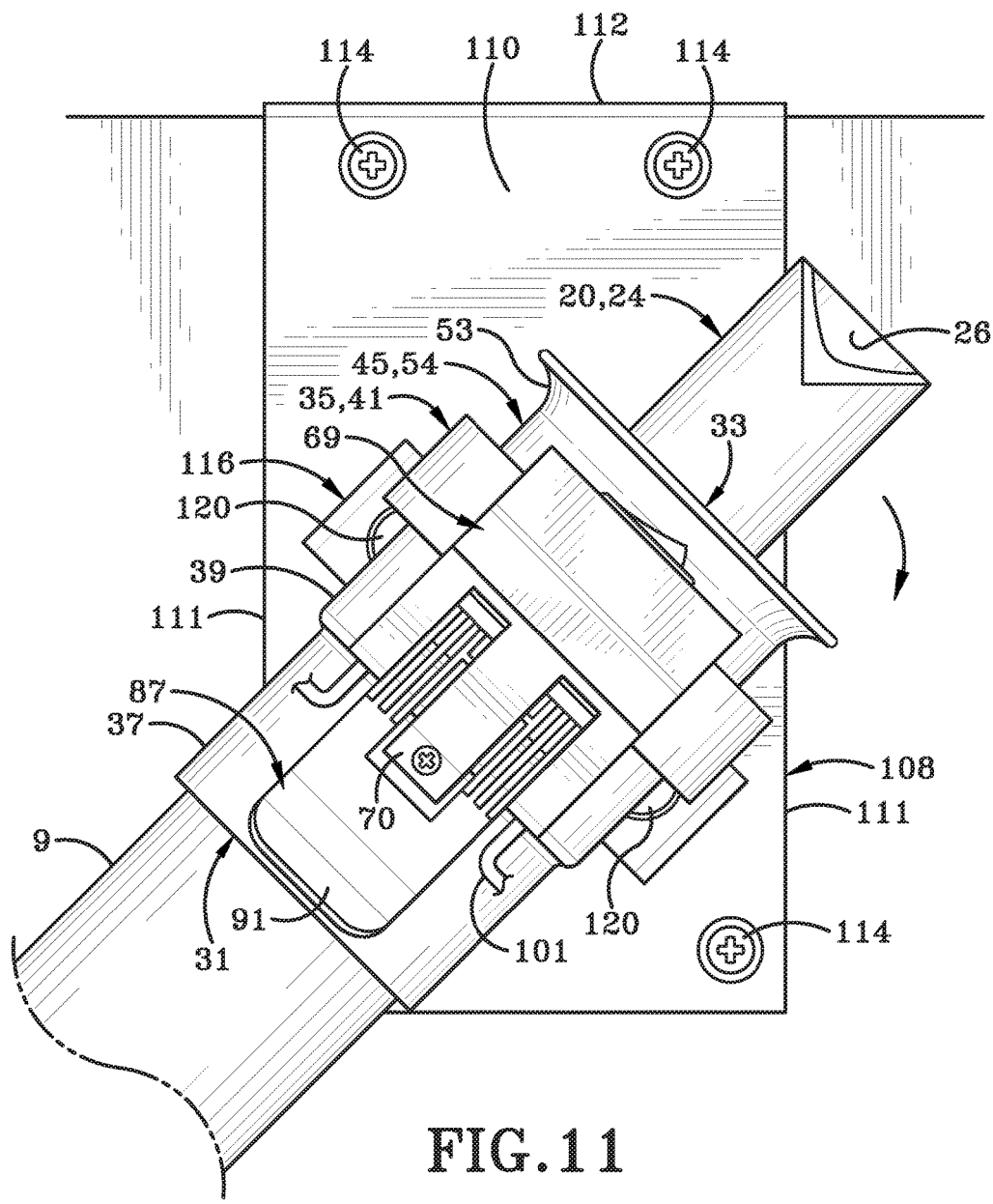
FIG. 11 is a view similar to FIG. 10 showing the locking collar and mounting clamps rotated 45° in the clockwise direction from the vertical position of FIG. 5.
Figure 12:
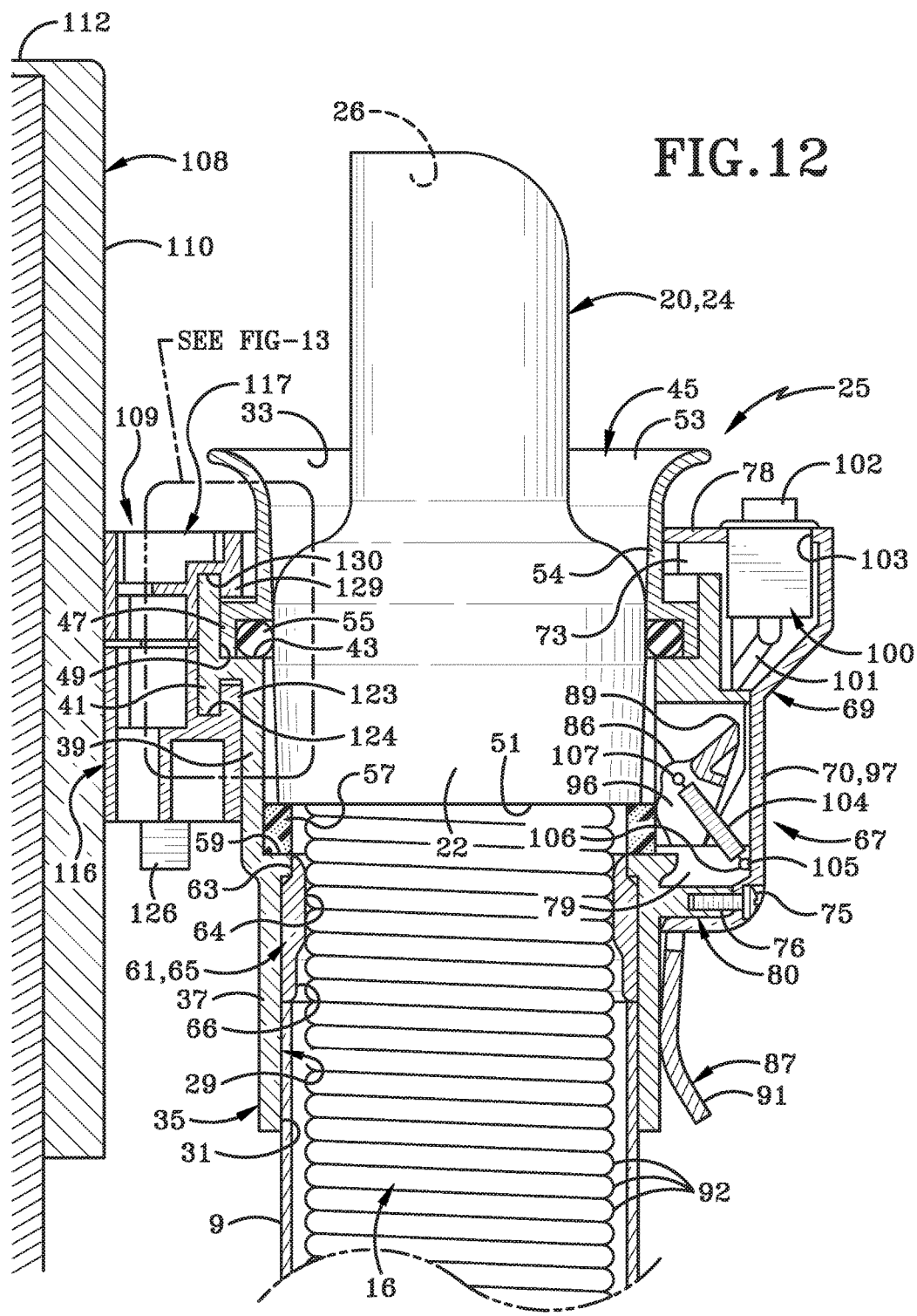
FIG. 12 is an enlarged sectional view taken along line 12-12, FIG. 8 showing the cleaning nozzle handle in a sealed and stored position in the locking collar.
Figure 13:
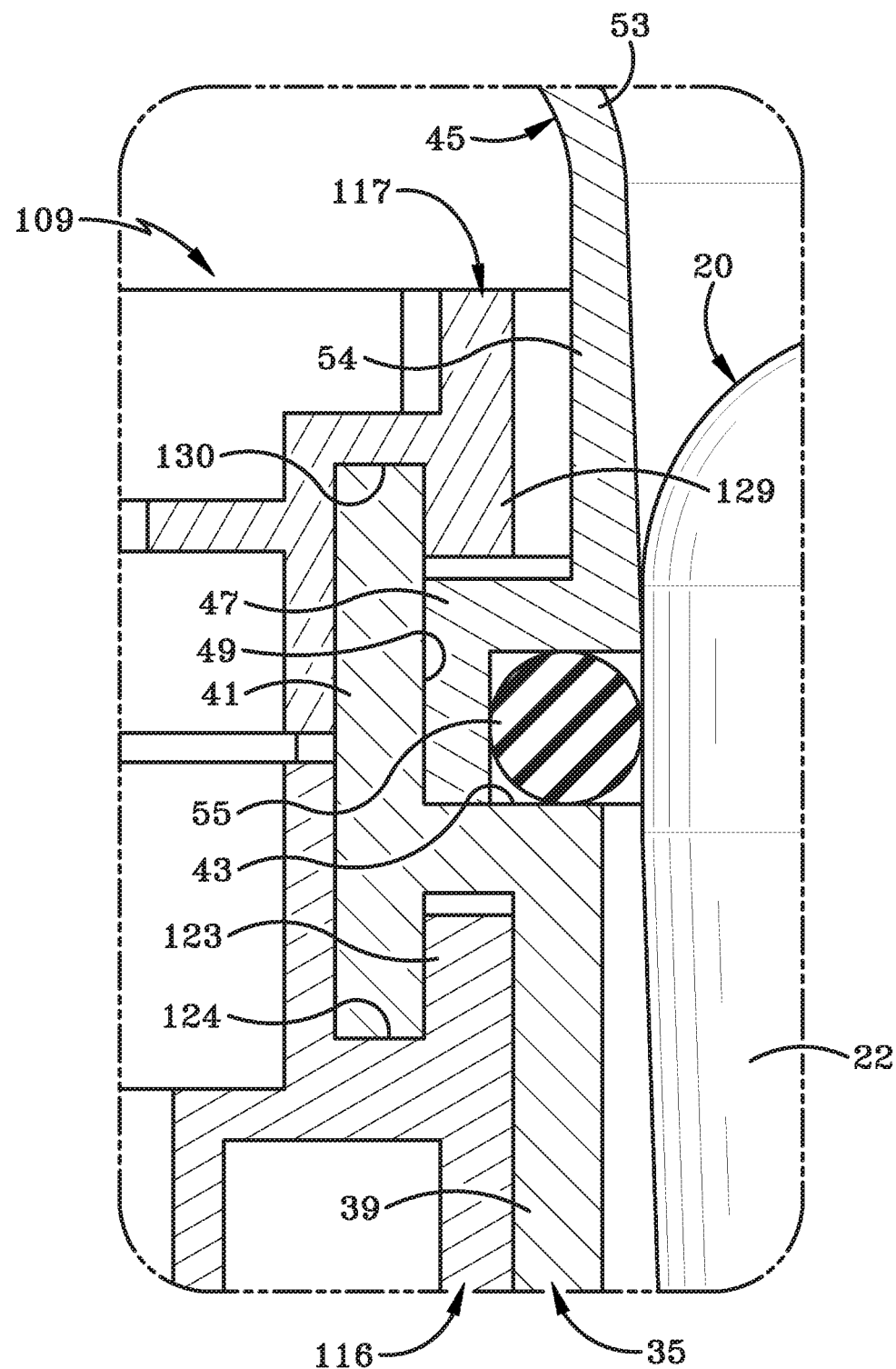
FIG. 13 is an enlarged view of the encircled portion in FIG. 12.

In accordance with another feature of the invention, which is especially helpful when mounting collar 25 in the narrow confines of an RV, is the ability to place collar 25 at various angular positions on mounting bracket 108 as shown particular in FIGS. 7, 10, and 11. This is achieved by selecting an appropriate pair of holes 115 through which mounting bolts 120 will extend when mounting the clamp mechanism onto mounting bracket 108. As shown in FIG. 7, locking collar 25 is in a true vertical position and alignment with respect to the mounting plate as shown in FIGS. 5 and 6. However, it can easily be mounted in a variety of angular positions with respect to the mounting plate as shown in FIGS. 10 and 11, by merely selecting the appropriate holes on mounting bracket 108 for receiving bolts 120.

Another feature of clamp mechanism 109 is the ability to mount clamp bodies 116 and 117 directly onto a supporting structure by a pair of fasteners, such as screws, which will replace bolts 120 and extend directly through holes 119 into the supporting structure eliminating the need for bracket 108. Again, after securing bottom clamp body 116 to a supporting structure, top clamp body 117 is then secured thereto by bolts 126. It is readily apparent that bottom clamp member 116 can be mounted at various angles on a supporting structure, whether it extends vertically, horizontally, or on the side, top or bottom of a structure such as a cabinet or wall, after which the angular position of the valve body can be adjusted thereon as shown in FIG. 8.

When a user wishes to use handle 20 for cleaning an area adjacent collar 25, he or she will manually pull outwardly on handle 20 extending hose 16 from within its stored position within conduits 9 or 23 to a desired length. Locking finger 87 will pivot freely in the direction of arrow A of FIG. 14 enabling hose 16 to slide past locking end 89 of finger 87 until the desired amount of hose is pulled from within the conduit. Locking finger 87 will pivot automatically in the direction of arrow B by the bias of spring 104 whereupon locking end 89 will automatically become engaged in a locking relationship within one of the valleys 90 formed between adjacent peaks 92 of hose 16. The operator can easily extend the hose further from within the conduit by merely pulling outwardly on the handle whereupon the lock finger will pivot out of locking engagement with hose 16 until the desired length is reached. Upon stopping this outward movement locking finger 87 will immediately assume another locked position within another valley 90. To unlock hose 16, the operator merely pivots locking finger 87 out of its locked position by manually moving finger tab 91 in the direction of arrow A of FIG. 14 to the unlocked position of FIG. 16. In this position, locking end 89 is removed from within its locked position with the hose. Finger 87 will remain in the unlocked position of FIG. 16 after being manually moved to this position by the biasing action of spring 104.

The hose will be automatically withdrawn into the interior of the conduit after unlocking finger 87 by the force of the vacuum or by a coil spring within the hose, which construction and action is well known in the vacuum cleaning art. Hose 16 can be a rigid non-expandable hose if desired, which also is easily retracted within the conduit by the vacuum force and by manually pushing the hose back into the conduit when a cleaning operation is completed. In a typical installation, hose 16 may have a length of approximately 7 feet and extendable to a length of approximately 30 feet. Locking collar 25 is easily adaptable for use with various types of cleaning hoses whether they be the expandable type with or without internal springs, or a more rigid non-expandable hose.

When collar 25 is used in a vacuum cleaning system having multiple inlets such as shown in FIG. 1, a sealing end cap 137 (FIG. 2) is provided for manually placing over the open end 26 of handle 20 to seal the open end. End cap 137 in combination with sealing ring 57 as shown in FIG. 12 sufficiently seals the vacuum in conduits 9 or 23 and the open end of the handle. This double seal effectively seals the vacuum within the conduit and open end of the handle, enabling the vacuum supply to maintain the vacuum on the other inlets as shown in FIG. 1 and eliminates collar 25 from being enclosed in an air-tight box as in prior art inlet valves. End cap 137 preferably will have a tether (not shown) either connected to mounting plate 108, handle 20 or collar 25. When collar 25 is used in a single inlet dedicated vacuum cleaning system as shown in FIG. 1A, no end cap 137 will be required.

If desired, end cap 137 could be replaced with a type of molded holster (not shown) which will hold the handle in a stored position and seal the handle end simultaneously within the concept of the present disclosure.

In summary, the vacuum cleaning system and collar of the present disclosure enables the system to be installed in a usual dwelling with multiple vacuum inlets and particularly in an RV where space is at a premium. The collar can be mounted at various positions on a variety of supporting structures by a simple L-shaped mounting bracket 108 or directly by clamp members 116 and 117 which rotatably mount the collar body thereon enabling it to be rotated to a variety of positions. This adjustability of mounting the collar on the bracket in a variety of angular positions, as well as the rotational mounting of the collar body on the supporting clamp brackets enables the collar to match the available space and enables the user to easily grasp the handle therefrom when performing a cleaning operation.

The use of internal sealing ring 57, together with the sealing provided by end cap 137, enables the collar to be used in a multiple inlet valve vacuum cleaning system and provide an inlet valve which is open to the ambient atmosphere avoiding the additional expense of providing an air-tight inlet valve. The incorporation of switch 100 in the locking mechanism housing provides a readily accessible means of turning the vacuum system ON and OFF. Likewise, ring 55 provides a retention mechanism to assist in retaining handle 20 within the collar as shown in FIG. 12 in addition to assisting the vacuum seal therewith. Again, the rotational mounting of the collar body offers a wide degree of installation versatility while still securely holding the handle in a stored position, and the selective mounting of the clamp members on the bracket and the L-shaped configuration of the bracket and multiple mounting holes allows installation at various angular orientations and on various supporting structures, especially in an RV where space is at a premium.

Figure 18:
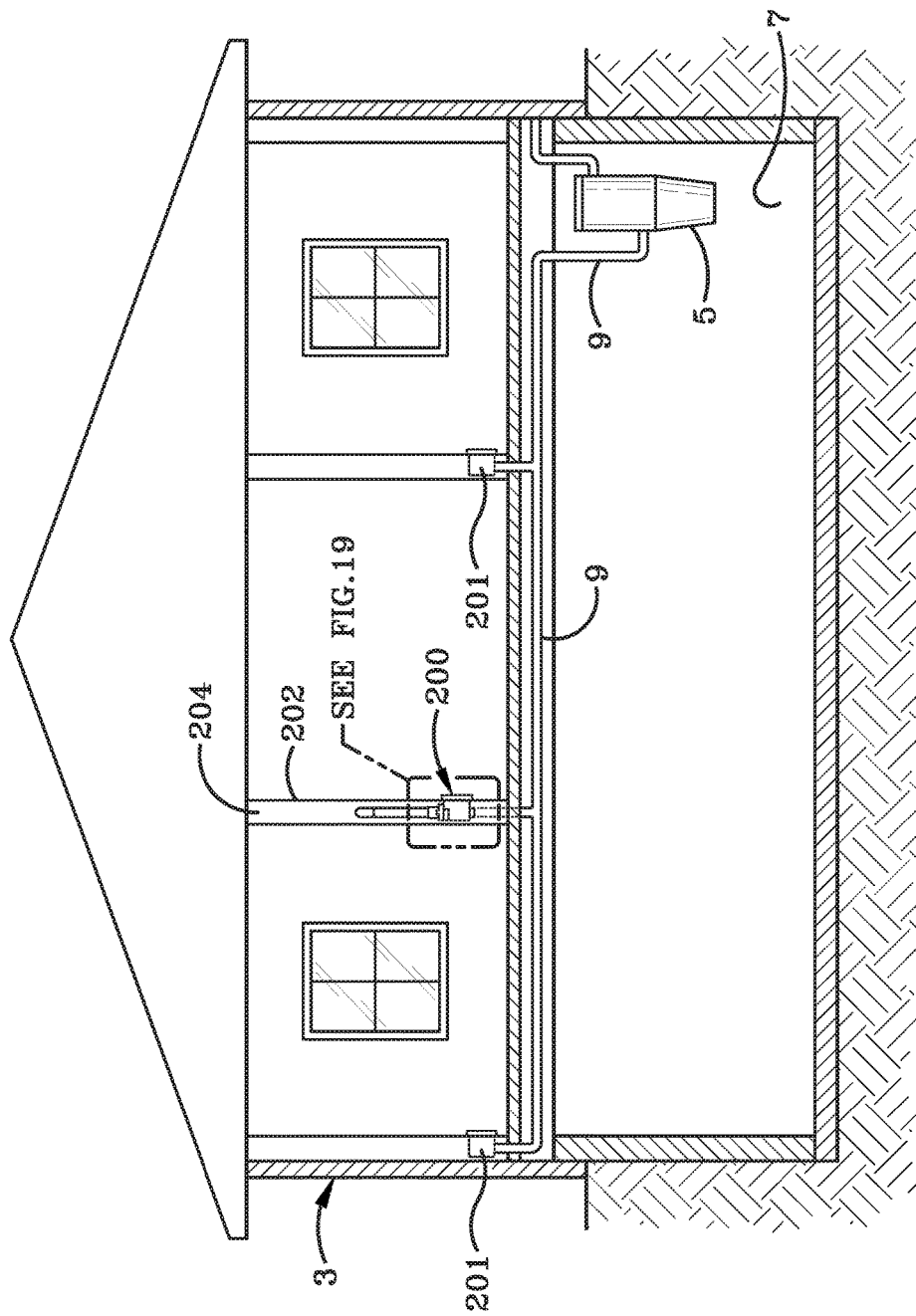
FIG. 18 is a diagrammatic view similar to FIG. 1 showing other types of inlet valve boxes mounted within a structure
Figure 19:
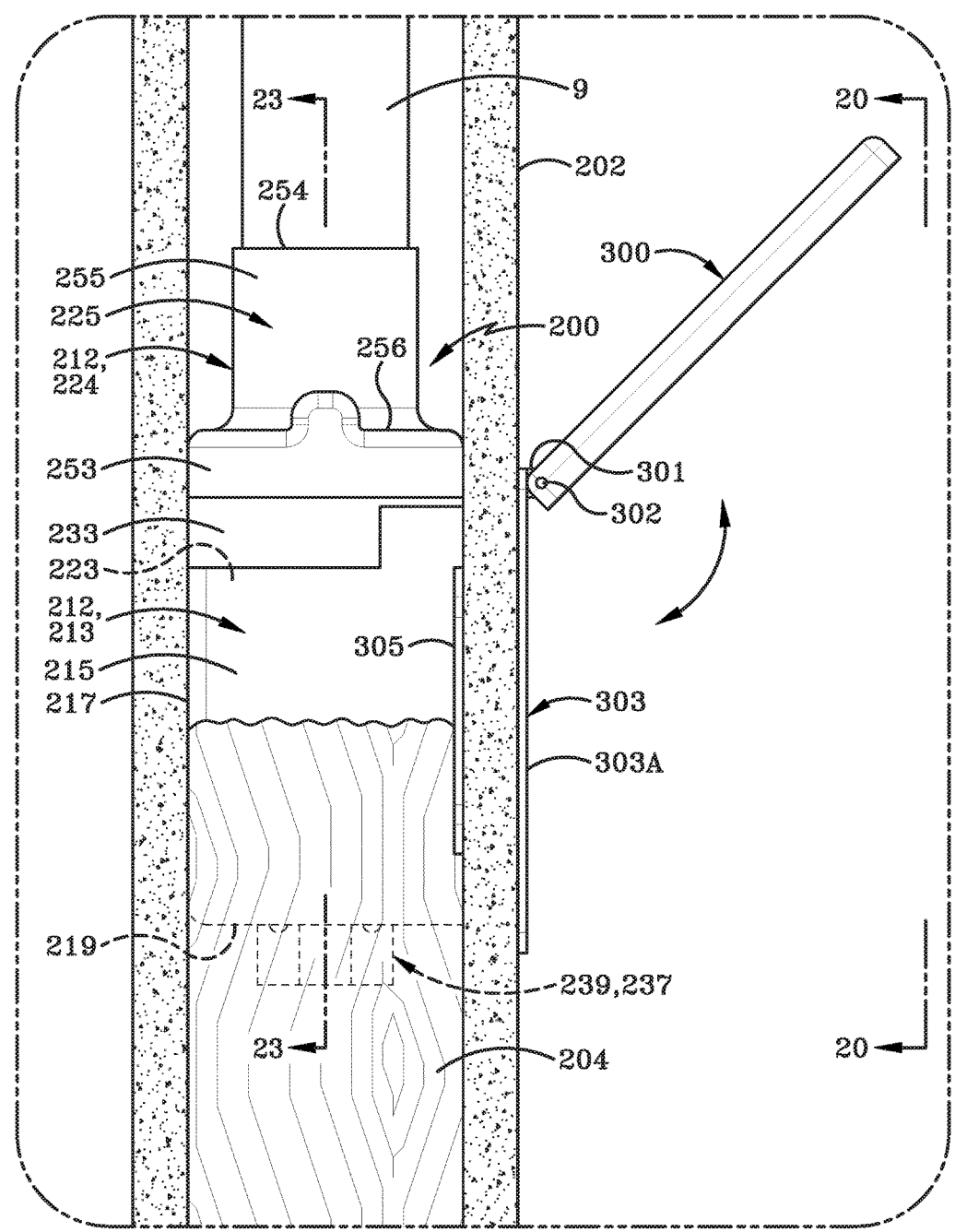
FIG. 19 is an enlarged view of the encircled portion of FIG. 18 with portions broken away showing another type of inlet valve of the present disclosure mounted in a wall opening with the closure door in open position.

FIG. 18 is another example of a central vacuum cleaning system in which another embodiment of the inlet valve of the present disclosure is incorporated, and which is indicated generally at 200. Inlet valve 200 is shown mounted within structure 3 and connected to central vacuum source 5 by a conduit 9. The vacuum system may contain other types of inlet valves such as indicated at 201, located at other locations in the structure. Again, the number of conduits and inlet valves and types of inlet valves will depend upon the size of the structure, number of rooms, size of the vacuum source 5, and other factors.

Inlet valve 200 is shown particularly in FIGS. 18-26 attached to a wall stud 204 and accessible through an opening formed in an attached wall board 202, such as drywall used in a usual home construction. Inlet valve 200 of this modified embodiment is hereafter referred to as a valve box to distinguish from locking collar 25 discussed above. Valve box 200 can be used in various types of constructions and other structure locations than that shown in FIGS. 18 and 19 within the concept of the present disclosure.

Valve box 200 includes a main body or housing indicated generally at 212, formed by a lower portion 213 and an upper portion 224. Lower portion 213 (FIGS. 20A and 21A) is formed by a pair of side walls 215, a rear wall 217, a top wall 218 and a bottom wall 219, which walls define an interior chamber 214, a front or outer end opening 221 and an open top 223. Lower portion 213 preferably will have a rectangular shape as shown in FIG. 21A.

Upper portion 224 (FIGS. 20B and 21C), includes a box top 225 which is mounted on and encloses open top 223 of lower portion 213. The upper edges of side walls 215 of lower portion 213 are formed with U-shaped channels 227 (FIG. 20A) which slidably receive therein complementary-shaped channels 229 formed along side walls 231 of a lower rectangular-shaped bottom portion 233 of box top 225 to mount upper portion 224 on lower portion 213. This sliding engagement enables lower portion 213 and upper portion 224 of housing 212 to be produced independently, preferably of a molded plastic, and then assembled after the various internal components thereof which are described below, are mounted respectively in lower portion 213 and top portion 224.

An enlarged opening 235 (FIG. 22A) is formed in bottom wall 219 of lower portion 213 of housing 212 and receives therein a generally rectangular portion 237 (FIGS. 20A, 21A, and 22A) of a bottom bracket indicated generally at 239, which is secured therein by screws 238. It is readily understood that portion 237 and complementary-shaped opening 235 can have other shapes such as round, oval-shaped, etc. Bracket 239 is formed with a pair of spaced vertically extending channels 241 (FIG. 23) in which are mounted a pair of compression coil springs 243. Springs 243 engage a horizontally extending pin 245 which extends through a diametric hole 247 formed in a ball 249. Ball 249 is located in a central channel 251 formed in bottom bracket 239. A downwardly extending ramp 240 (FIGS. 20 and 22B) is formed by a recessed area in top wall 242 which is formed with an upper flange 244 in which ball 249 is located. The purpose and function of bracket 239 and ball 249 are described further below.

Box top 225 (FIGS. 20B, 21C and 25), in addition to having a lower rectangular portion 233, includes a cylindrical intermediate portion 253 which is connected to an upper reduced diameter cylindrical top portion 255 by a horizontal annular portion 256 providing a bell-shaped configuration to box top 225. Box top 225 is formed with a hollow interior 258 which terminates in a top opening 254. Box top 225 preferably will be a one-piece molded plastic member as are portions 213 and 224 of housing 212. The hollow interiors 214 and 258 of lower portion 213 and box top 225 provide a through bore for inlet valve 200 which terminates in inner open end 254 and outer open end 221 for the passage of a flexible hose 285 therethrough.

Figure 25:
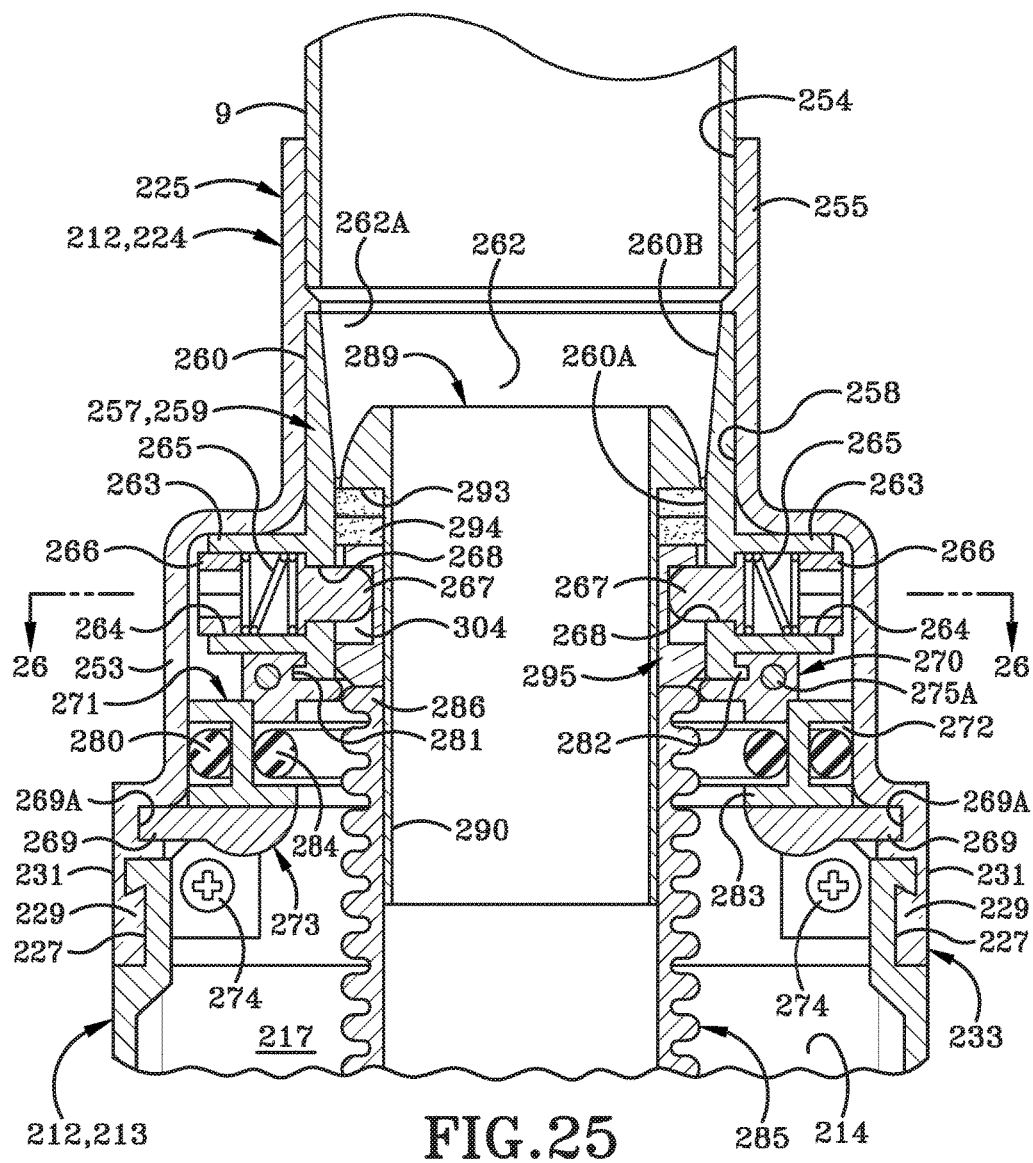
FIG. 25 is an enlarged fragmentary sectional view taken on line 25-25, FIG. 24 of the distal end of the hose when the hose is in a fully extended position.
Figure 26:
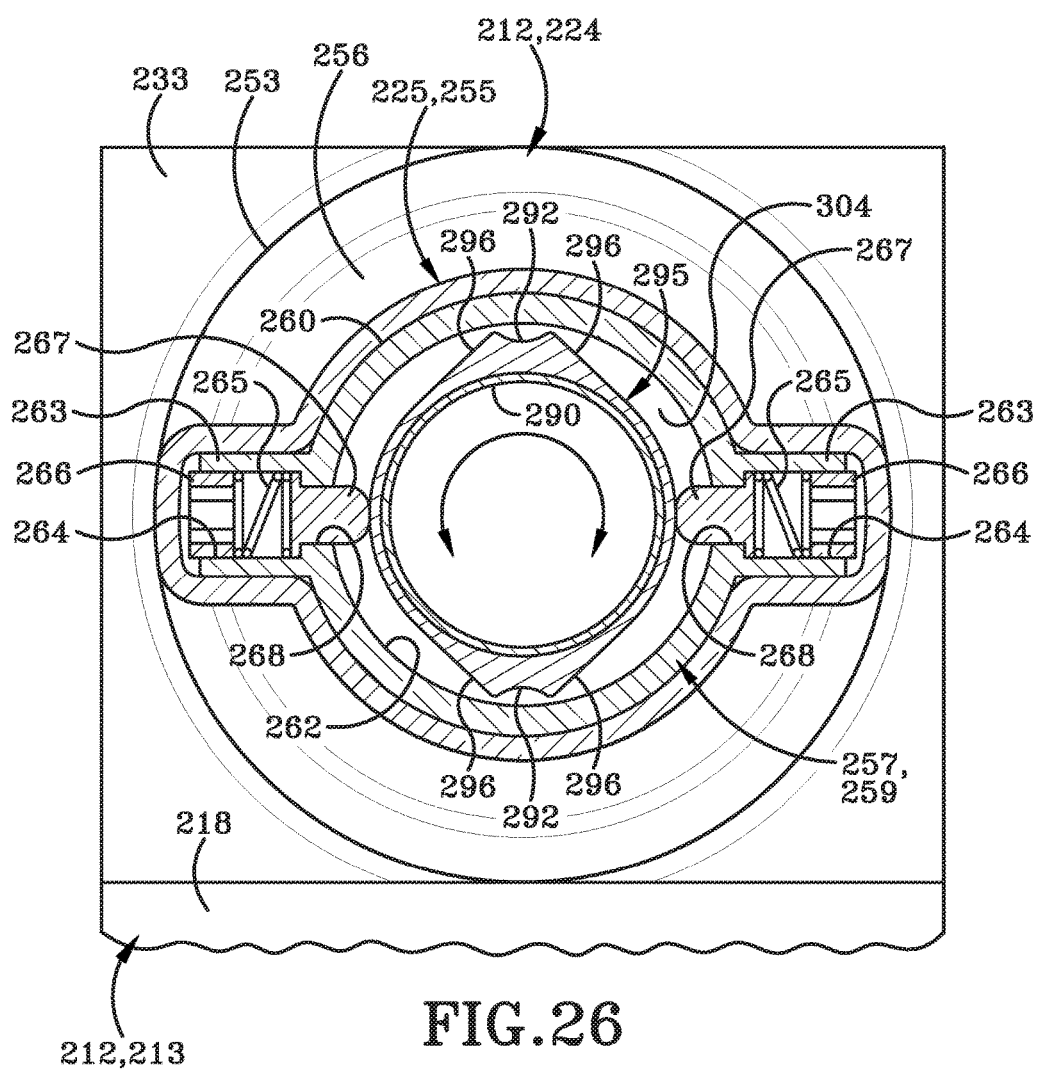
FIG. 26 is a sectional view taken on line 26-26, FIG. 25.

Within box top 225 is a cylindrical sleeve (FIGS. 22A, 22B, 24 and 25) indicated generally at 257, which provides another seal when the hose reaches its fully extended position as discussed further below. Sleeve 257 has a generally annular configuration formed by an annular wall 259 which has a cylindrical outer surface 260 and a cylindrical lower inner surface 260A which terminates in an outwardly tapered upper inner annular surface 260B which forms a top opening 262A. A pair of diametrically opposed cylindrical lugs 263 extend outwardly from annular wall 259 (FIGS. 25 and 26). Each lug 263 has a hollow bore 264 in which is contained a spring 265 retained therein by an end plug 266. Each spring 265 biases a button 267 outwardly through a hole 268 formed through wall 259 and into the hollow bore 262 of cylindrical sleeve 257. The function of buttons 267 is described further below.

Figure 20:
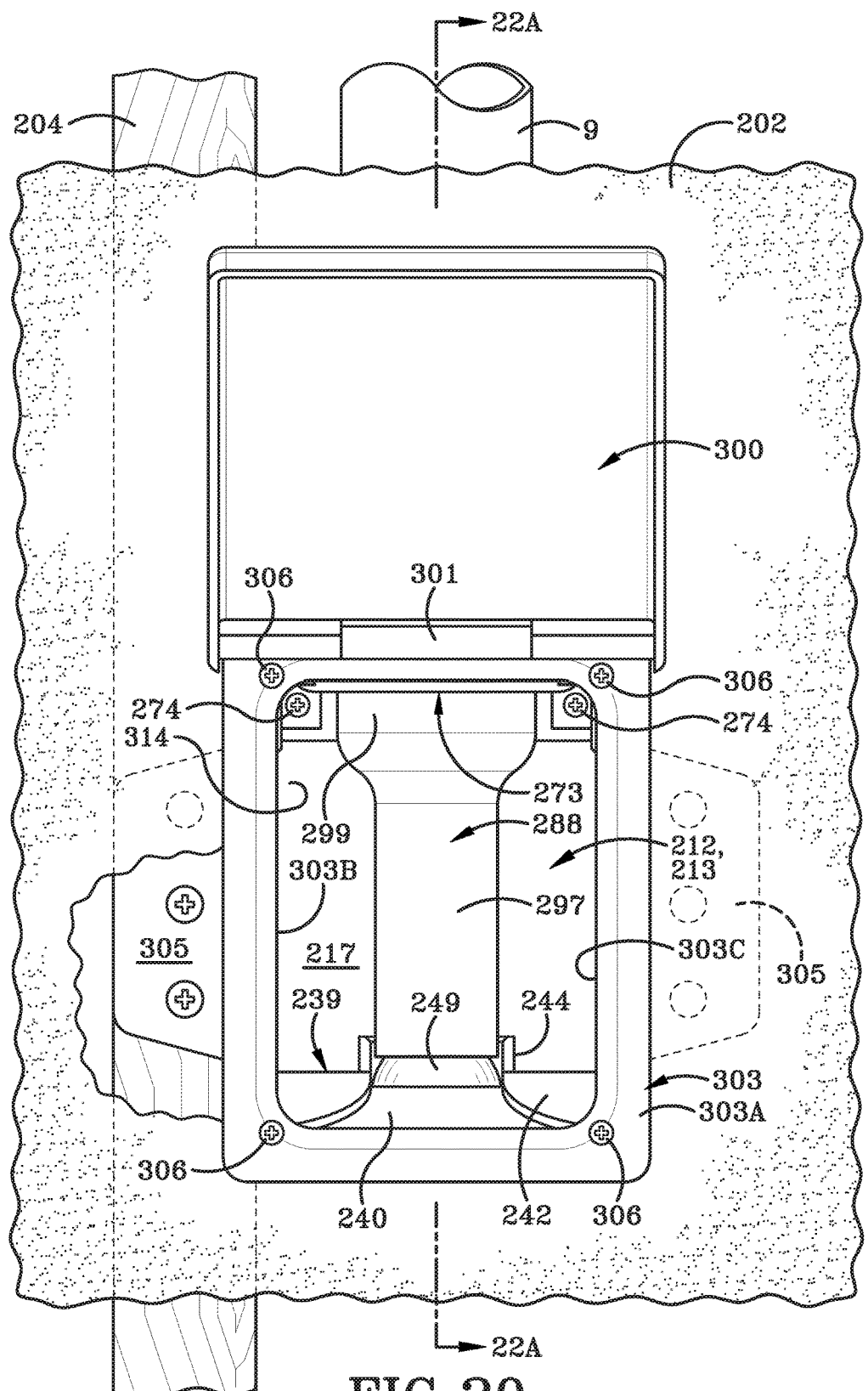
FIG. 20 is a front elevational view looking in the direction of arrows 20-20, FIG. 19.
Figure 20B:
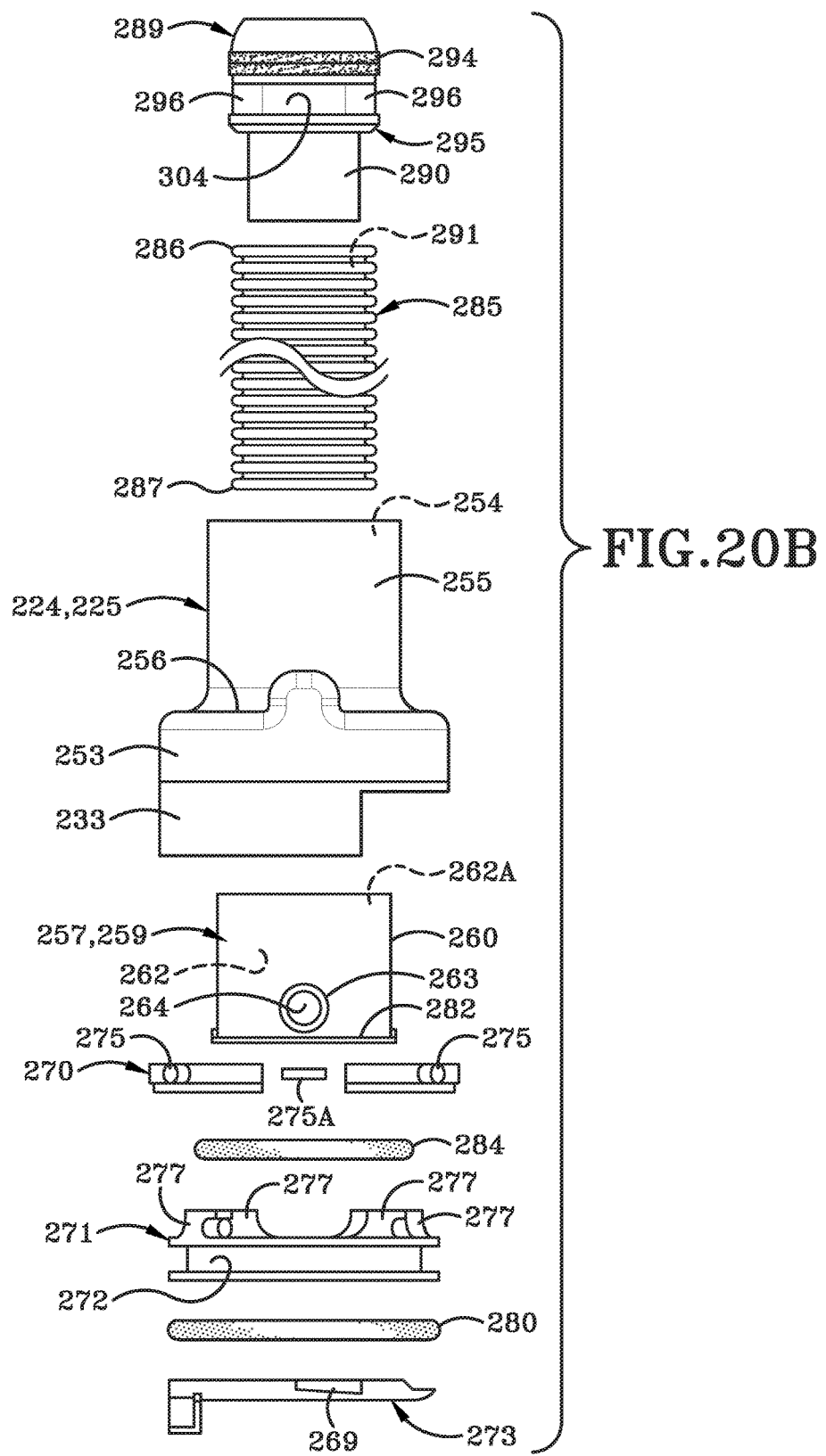
FIG. 20B is an exploded side elevational view of many of the components in the upper portion of the valve box of FIG. 20-20A and the distal end of the vacuum hose.

Sleeve 257 is retained within interior 258 of box top 225 by a slip-fit engagement and by a two-piece hose stop ring indicated generally at 270 (FIGS. 20B and 21C). Ring 270 is clamped against the bottom of annular wall 259 of sleeve 257 by an annular O-ring support ring, indicated generally at 271 (FIG. 25). Ring 271 is seated upon and secured within box top 225 by a one-piece horseshoe-shaped retaining bracket 273. Bracket 273 is secured within the bottom of box top 225 by a pair of lugs 269 which are slidably received in a pair of channels 269A formed in lower rectangular portion 233 of box top 225 and then by a pair of screws 274 or other type fasteners. Retaining bracket 273 can be easily removed from valve box 200 together with support ring 271 and split ring 270 for ease of repair should the need arise in the future.

Ring 270 includes four outwardly projecting studs 275 which are slidably received in four channel forming lugs 277 projecting upwardly from O-ring support ring 271 which assembles stop ring 270 and support ring 271 within the box top 225. Ring 270 has a cylindrical inner channel 281 in which is seated the bottom circular edge 282 of sleeve 257. Top opening 254 of box top 225 slidably receives an end of a rigid conduit 9 therein and is secured usually by some type of an adhesive. The two semicircular pieces which form ring 270 are joined by a pair of pins 275A (FIGS. 20B and 25).

It is readily understood that ring 270 can be a single piece and not a split ring as described above and which provides some resistance to the hose being pulled out of valve box 200 but not prevent it from being removed therefrom. This will enable the hose to be replaced if necessary, without removing the valve box from the wall.

O-ring support ring 271 has an outer u-shaped channel 272 in which is secured an outer O-ring 280 and an inner annular ledge 283 on which is supported an inner O-ring 284. Inner and outer O-rings 284 and 280 of support ring 271 form an upper sealing assembly 310 for engaging a debris pickup nozzle handle indicated generally at 288, as shown in FIG. 22A, the function of which is described further below.

A length of a usual type of a flexible vacuum cleaning hose 285 is slidably mounted within the interior of conduit 9 and has a distal end 286 and a nozzle end 287 on which is mounted a nozzle handle 288. Referring to FIGS. 20B, 21C and 22A, a hose plug indicated generally at 289, is mounted in distal end 286 of hose 285 by inserting a cylindrical tubular end section 290 into the interior bore 291 of hose 285 and secured therein by an adhesive, friction fit, threaded connection or other type of securement means. The top end of hose plug 289 is curved downwardly and forms a bottom annular horizontally extending ledge 293 against which is seated a sealing ring 294. Sealing ring 294 is formed of a flexible material, preferably a felt-type of material, and has an annular configuration with an outer diameter just slightly smaller than the inside diameter of conduit 9. An annular button release ring indicated generally at 295, is secured to and extends about cylindrical tubular end section 290 of plug 289 and clamps sealing ring 294 in position against ledge 293. Ring 295 preferably is secured on end section 290 by an adhesive or other type of attachment. Ring 295 is formed with an annular channel 304 having a pair of camming surfaces 296 which are separated by a pair of diametrically opposed vertically extending grooves 292 the function of which are discussed below (FIGS. 25 and 26).

Figure 22A:
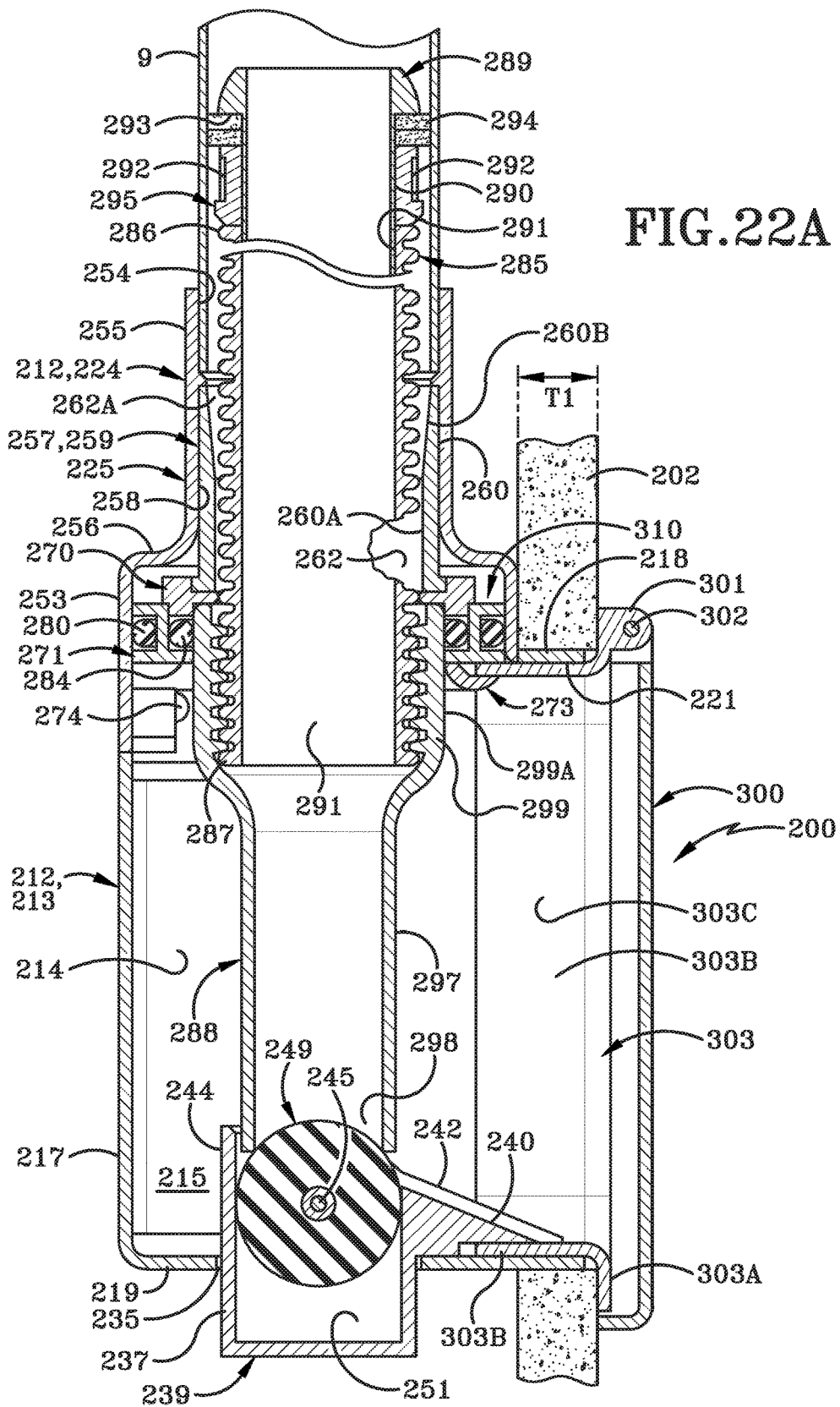
FIG. 22A is a sectional view taken on line 22A-22A, FIG. 20.

Nozzle handle 288 is of a usual construction having a cylindrical elongated end 297 which terminates in a debris pickup end opening 298 (FIGS. 20A and 22A). End 297 flares outwardly into a cylindrical hose attachment end 299 into which the nozzle end 287 of hose 285 is secured by an adhesive, threaded attachment or other type of securement means.

Hose 285 is of a usual construction used for central vacuum cleaning systems and has sufficient flexibility to move into and out of valve box 200 and around bends in the conduit when manipulated by an individual during use and which slides easily along the interior of conduit 9 yet provides a sliding vacuum seal therebetween by sealing ring 294. Hose 285 can be the type which is non-extendable or stretchable as used in many types of vacuum cleaning systems within the concept of the present disclosure.

The other edges 215A of housing side walls 215, edge 219A of bottom wall 219 and edge 218A of top wall 218 form front end opening or port 221 through which nozzle handle 288 and hose 285 extend from for performing a debris pickup cleaning operation and then retracted into the housing for subsequent storage in the interior chamber 214 of housing 212. Preferably, an outer closure door 300 (FIG. 21B) is pivotally mounted at the upper end of lower portion 213 of housing 212 at the junction with box top 225 for opening and closing front end opening 221 in order to conceal interior chamber 214 of lower portion 213 and to provide an attractive faceplate for valve box 200 when mounted on wall stud 201 or other support structure. Door 300 is pivotably mounted with respect to housing 212 by a pivot pin 302 which extends through a flange 301 formed on and extending outwardly from a door mounting frame indicated generally at 303. Door mounting frame 303 has a rectangular outer frame 303A and a rectangular inner frame 303B which defines a rectangular opening 303C. Inner frame 303B extends perpendicularly from outer flange 303A.

Figure 22B:
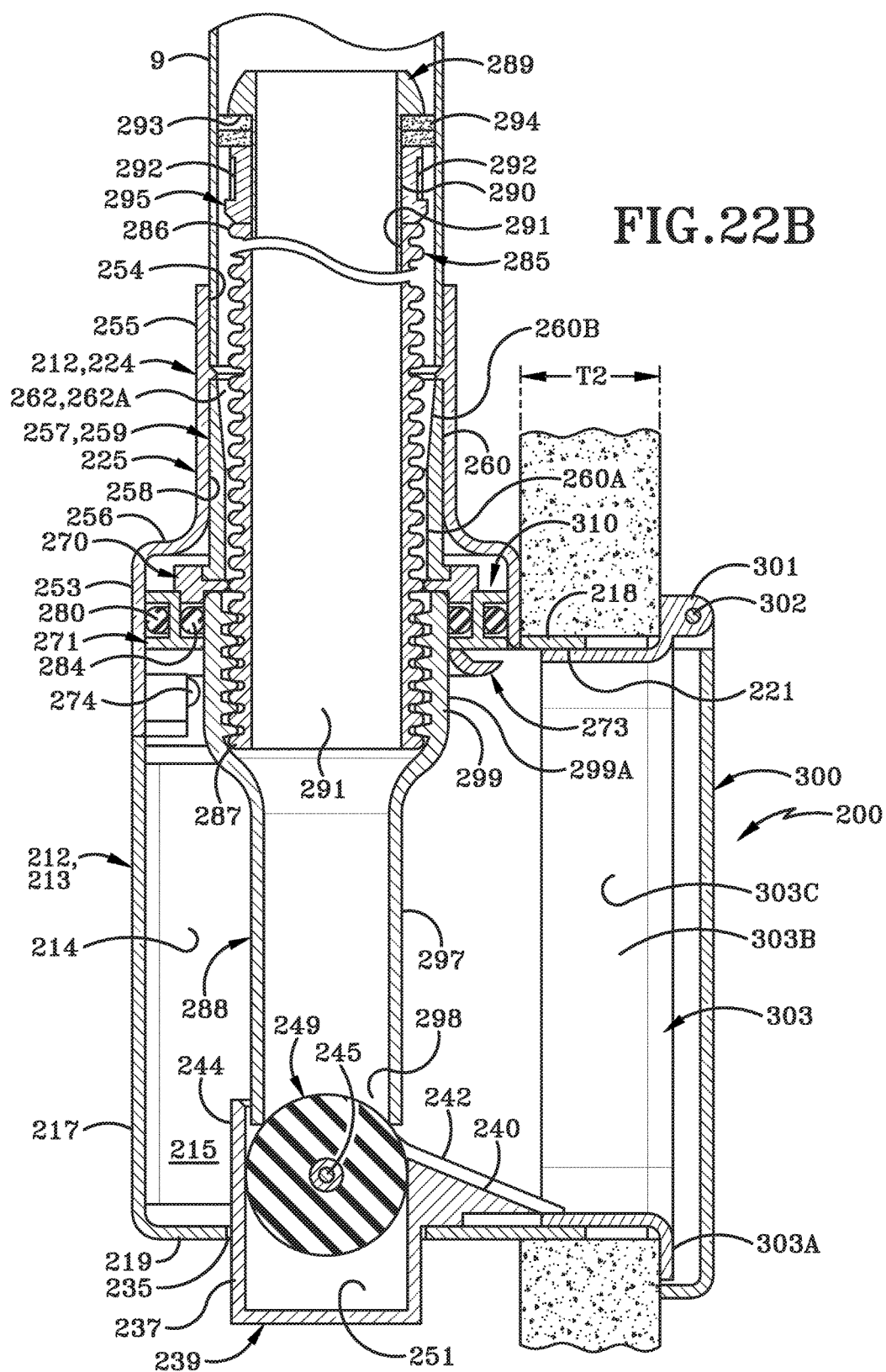
FIG. 22B is a sectional view similar to FIG. 22A showing the valve box mounted in a structure having a thicker outer wall than that shown in FIG. 22A.
Figure 23:
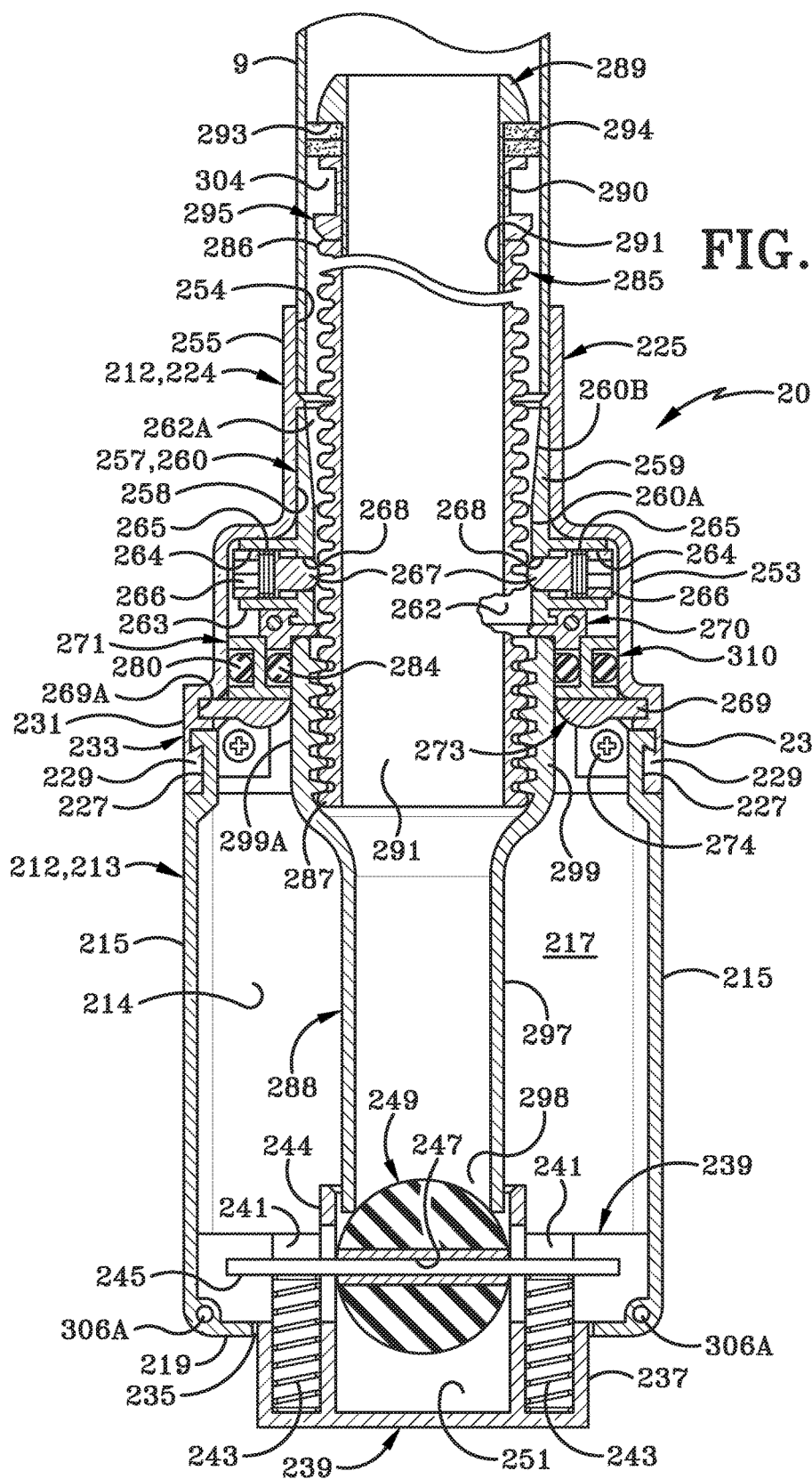
FIG. 23 is a vertical sectional front view of the valve box similar to FIG. 22A.

Door frame 303 is adjustably mounted on lower portion 213 of housing 212 by inner frame 303B forming a sliding friction fit with the interior surfaces of side walls 215, bottom wall 219 and top wall 218 as shown in FIGS. 22A and 22B to compensate for different thicknesses T1 and T2 of wall boards 206. The bottom member of inner frame 303B is slidably received beneath ramp 240 of bottom bracket 239 to assist in retaining door frame 303 on lower portion 213 of housing 212. Door frame 303 is secured to housing 212 by a plurality of fasteners 306 which extend into preformed holes 306A formed in the corners of lower portion 213, as shown in FIGS. 20 and 20A.

One or more mounting flanges 305 are formed integrally with or attached to one or both side walls 215 of lower portion 213 and extend outwardly therefrom for mounting valve box 200 to wall stud 204 or other support structure, which could be the aluminum or wood studs of a building, a concrete wall or other type of material from which the structure is formed. Door 300, door frame 303, mounting flanges 305 and valve box 200 can be formed of various materials such as of a rigid molded plastic or various other types of metal materials without affecting the concept of the invention.

In accordance with one of the features of the invention, lower portion 213 of housing 212 and box top 225 and their relationship to each other and to door 300 do not require or form an air-tight structure since such a condition is not required due to the unique double seal arrangement described further below.

The manner of use of valve box 200 within the vacuum system shown in FIG. 18 and the interrelation and function of the various components discussed above are now described in detail. As previously stated, one of the main advantages of valve box 200 is that it is not a sealed box as in prior art inlet valves used in central vacuum cleaning systems. This feature is achieved by providing upper and lower seals in housing 212 by the use of lower bottom bracket 239 containing sealing ball 249 and upper sealing assembly 310 containing O-rings 280 and 284 with additional sealing assistance by sealing ring 294 on the distal end of hose 285 and the inner surface of sleeve 257 as shown in FIGS. 22A and 24.

When nozzle handle 288 is in a retracted stored position (FIGS. 19, 22A and 23), ball 249 is biased upwardly by coil springs 243 into sealing engagement with end opening 298 of the nozzle handle. This seals the vacuum created within hose 285 by vacuum source 5 from the surrounding atmosphere. Also, when nozzle handle 288 is in this retracted stored position, upper sealing assembly 310 and in particular inner and outer O-rings 280 and 284 will seal the vacuum created within conduit 9 from the ambient atmosphere and interior of housing 212 (FIG. 6A). Thus both the vacuum created within the hose and that created within the connecting conduit is completely sealed within housing 212. This avoids the necessity of providing an air-tight box as required by other inlet valves for central vacuum cleaning systems.

Figure 24:
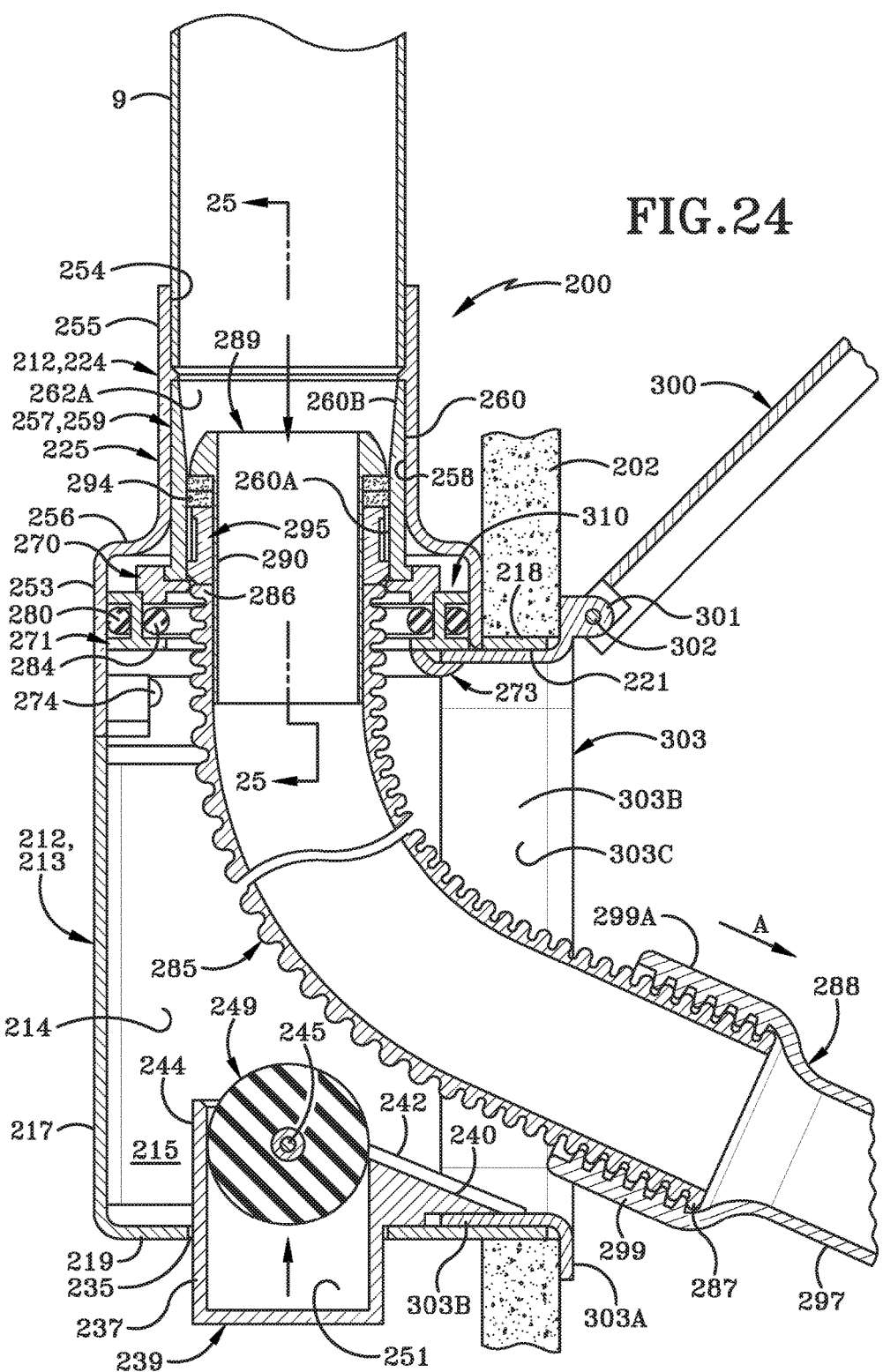
FIG. 24 is a side sectional view similar to FIG. 22B showing the nozzle handle removed from the valve box and the hose in a fully extended position.

When an individual desires to perform a cleaning operation, the individual merely grasps nozzle handle 288 and pulls outwardly, as shown by arrow A in FIG. 24, which will automatically cause ball 249 to be depressed downwardly within central channel 251. Continuing pulling outwardly on nozzle handle 288 will slide the hose along the interior of conduit 9 until a desired length is pulled from valve box 211 for use in a debris pickup cleaning operation. Hose plug 289, and in particular sealing ring 294, will provide a sliding seal within the interior of conduit 9 throughout its length of travel therein. This provides a sufficient seal so that most of the vacuum within conduit 9 is applied to end opening 298 of nozzle handle 288. After a cleaning operation has been completed, the user merely pushes the nozzle handle and hose back into valve box 200 through front end opening 221 in an opposite direction to that of arrow A in FIG. 24 until the end of the nozzle handle engages ramp 240 of bottom bracket 239 and upon continuing moving inwardly will easily depress ball 249 against springs 243 until the nozzle handle is fully seated in the housing after which the springs will bias ball 243 into sealing engagement with end opening 298 of nozzle handle 288 as shown in FIG. 22A. Nearly simultaneously with ball 249 sealing end opening 298, O-ring 284 will provide an air-tight seal with cylindrical outer surface 299A of hose attachment end 299. This operation is performed relatively easy by a user merely pushing the nozzle handle inwardly resulting in the hose sliding further into conduit 9. The vacuum created within the conduit also assists in pulling the hose into conduit 9. To remove nozzle 288 from housing 212, a user merely grasps cylindrical end 297 of the nozzle handle and pulls outwardly automatically depressing ball 249 enabling the hose to be easily pulled from housing 212.

Another advantage of the present disclosure is that hose stop ring 270 in combination with buttons 267 prevent the distal end of the hose from being pulled completely from valve box 200. As shown in FIGS. 24-26, upon distal end 286 of hose 285 reaching valve box 200, buttons 267 by the biasing force of springs 265 will snap into engagement within annular channel 304 of ring 295 and into engagement with camming surfaces 296 which prevents further movement of the hose in an outwardly direction from housing 212. After the cleaning operation has been performed, the individual merely will grasp the portion of hose 285 adjacent front end opening 221 of housing 212 and upon a slight rotation thereof will move camming surfaces 296 along the ends of buttons 267 until the buttons reach vertically extending grooves 292 (see FIGS. 24 and 26) whereupon a slight inward pressure on the hose coupled with the vacuum applied to conduit 9, will enable the hose to slide easily inwardly into the conduit until nozzle handle 288 reaches housing 212. Again, upon reaching this position, the nozzle handle will move easily along ramp 240 and over ball 249 until the ball snaps into sealing engagement with the open end of nozzle 288. Thus, a user will merely rotate the hose and push slightly inwardly which will automatically disengage the buttons from end plug 266 enabling the hose to be withdrawn easily into the conduit. The movement of nozzle handle 288 into the interior of housing 212 will automatically engage inner O-ring 284 of sealing assembly 310 with the external surface of nozzle 288. Thus, again upon replacing nozzle end 288 into housing 212, the vacuum within the hose and nozzle is sealed by ball 249 and the vacuum within conduit 9 is sealed by sealing assembly 310.

Also as shown in FIG. 25, as distal hose end 286 reaches box top 225 upon the full extension of the hose from within the valve box, sealing ring 294 will move along tapered annular surface 260B of sleeve 257 until providing a seal against cylindrical inner wall 260A of annular wall 259 as shown in FIG. 24. This creates an effective seal enabling the full power of the vacuum to be applied to the interior of hose 285. Thus, while the hose is being pulled from within valve box 211, a seal is applied by sealing ring 294 along the inside of conduit 9 and which will be maintained throughout the movement of hose 285 through conduit 9 and into box top 225 to its full extended position as shown in FIG. 25. Sealing ring 294 will maintain a sliding seal with the interior of conduit 9 as the hose is retracted back into conduit 9 until nozzle handle 288 reaches its final retracted stored position as shown in FIGS. 22A and 22B where an effective seal is created by ball 249 and upper seal assembly 310 provided by inner O-ring 284 and outer O-ring 280. Ball 249 provides a seal for the vacuum within the hose and nozzle handles, and upper seal 310 provide an effective seal from any area on the outside surface of the hose.

Figure 27:
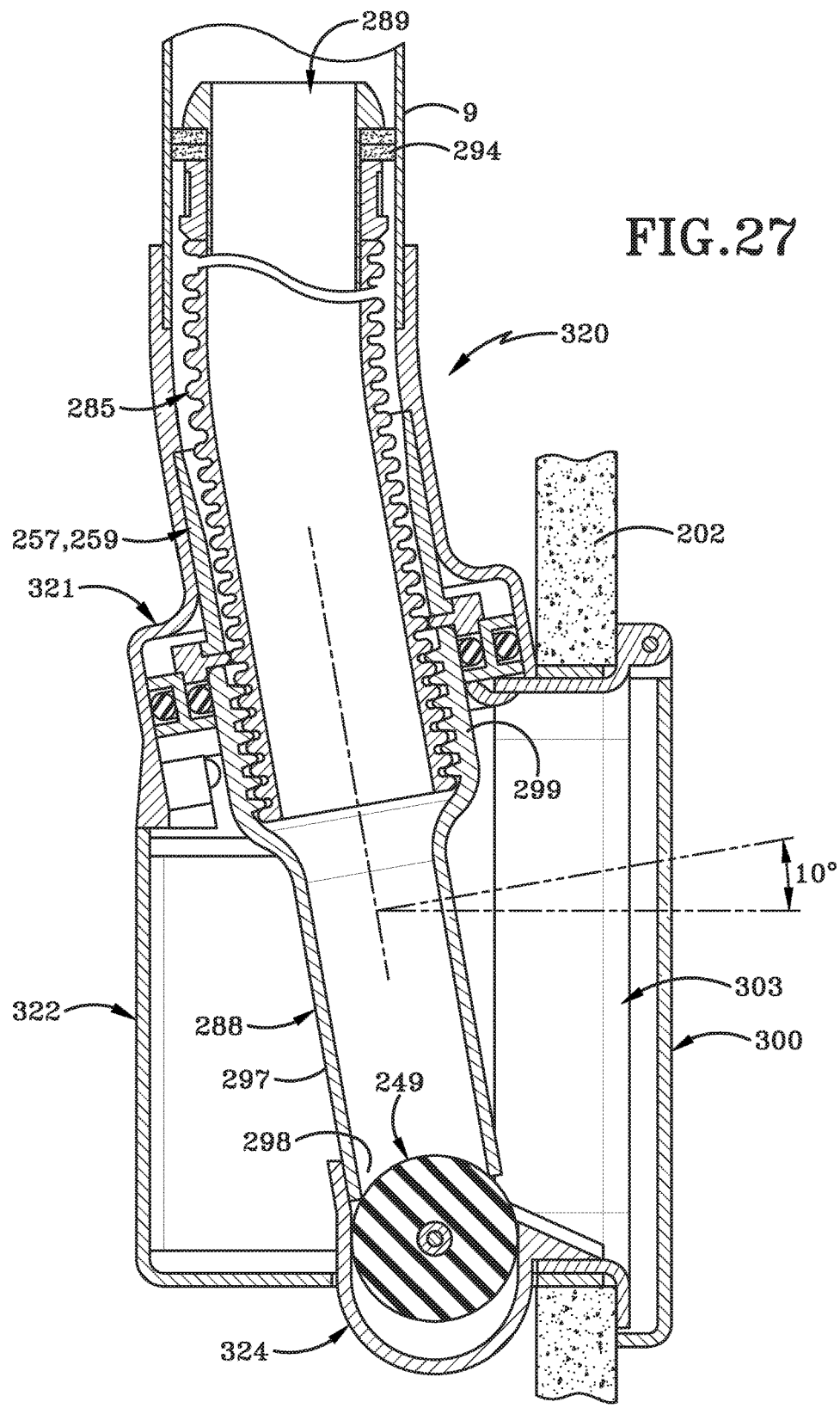
FIG. 27 is a side elevational view similar to FIG. 22A showing a modified valve box and seal assembly.

A modified embodiment of valve box 200 is shown in FIG. 27 and is indicated generally at 320. Valve box 320 is nearly identical to that of valve box 200 discussed above, with the main difference being that a top box 321, which is nearly identical to box top 225, is at an angle of approximately 10 degrees with respect to a lower rectangular portion 322 which again is similar or nearly identical to lower portion 213 of valve box 200. This angular relationship facilitates the outward pulling movement on nozzle handle 288 making it easier to remove the nozzle handle from within the valve box and/or replacing the same therein. It also reduces the amount of force needed for nozzle handle end to depress ball 249. The other components of this embodiment are similar or the same as that described above with respect to valve box 200 and thus are not described in further detail.

It is readily understood that an ON/OFF switch (not shown) could be mounted in valve box 200 or closely adjacent thereto and connected by wires to vacuum source 5 for controlling the vacuum source as used in many types of prior art valves.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. An inlet valve for mounting on a structure and connected to a conduit of a vacuum cleaning system comprising:
    a body formed with a bore with inner and outer open ends, said inner open end adapted to be connected with the conduit of the central vacuum cleaning system;
    a length of flexible hose adapted to be slidably mounted within the conduit and expandable from and retractable within the conduit and moveable through the bore of the body and through the outer open end, said hose having a nozzle end and a distal end;
    a handle mounted on the nozzle end of the hose, said handle having an open end for picking up debris from an adjacent area;
    a first seal mounted in the body and engageable with the handle when the hose is in a retracted position in the conduit and the handle is in a stored position in the body to provide a substantially air-tight seal between the handle and vacuum conduit;
    a second seal for sealing the open end of the handle when the handle is in the stored position in the body, said first and second seals sealing the conduit and open end of the handle from the ambient atmosphere at the inlet valve;
    wherein the body of the inlet valve includes a plurality of walls forming an open housing having an interior chamber open to the surrounding atmosphere, and in which the second seal is a spring biased ball mounted in a lower portion of the housing and engageable with the open end of the nozzle handle when the handle is in the stored position; and
    wherein the second seal includes a shaft extending through a hole formed diametrically through the ball for rotatably mounting the ball on the shaft; and in which a pair of compression springs bias the shaft inwardly into the interior chamber of the housing.

2. The inlet valve as defined in claim 1 wherein the body of the inlet valve includes a cylindrical collar providing the inner and outer open ends, a central section for receiving a portion of the handle, and in which the outer open end is flared outwardly from the central section for guiding the handle into the body when the hose is moving toward the retracted position.

3. The inlet valve as defined in claim 1 wherein the second seal is an end cap placed over the open end of the handle for sealing said open end when the handle is in the stored position in the collar.

4. The inlet valve as defined in claim 1 including an end plug mounted on a distal end of the hose providing a sliding air seal with the conduit and engageable with a stop ring mounted within the body to stop the distal end of the hose from moving through the body.

5. The inlet valve as defined in claim 1 in which the handle has an annular terminal edge; in which the first seal is an annular resilient ring mounted within the body; and in which the terminal edge of the handle seats upon said annular resilient ring when the hose is in the retracted position and the handle is in the stored position to provide an air seal with the conduit.

6. The inlet valve as defined in claim 1 including a mounting bracket and pair of clamp members engageable with the body for rotatably mounting the body on the mounting bracket for adjustably mounting the body on a support structure.

7. The inlet valve as defined in claim 1 wherein the first seal is an O-ring mounted in the upper portion of the housing and engageable with the nozzle handle when the nozzle handle is in the stored position in the housing.

8. The inlet valve as defined in claim 7 including a third seal mounted in the upper portion of the housing, said third seal including a cylindrical sleeve formed with a tapered bore for sliding engagement with a pliant ring mounted on the distal end of the hose.

9. The inlet valve as defined in claim 8 including at least one spring-biased button mounted in the cylindrical sleeve of the third seal for engagement with a collar mounted on the distal end of the hose when the hose is in a fully extended condition.

10. The inlet valve as defined in claim 1 wherein the lower portion of the housing has a front edge defining the outer open end of the body through which the hose is extendable and retractable from and into the interior chamber; in which a door frame is adjustably mounted on the housing to adjust the spacing between the front edge and door frame; and in which a closure door is pivotally mounted on the door frame.

11. The inlet valve as defined in claim 10 wherein the door frame is telescopically engageable with the housing within the front opening of the housing to adjustably mount the door frame thereon.

12. The inlet valve as defined in claim 8 in which the third seal is retained in the upper portion of the housing by a retaining ring secured within the housing by fasteners.

* * * * *